United States Patent
Cha et al.

(10) Patent No.: US 12,032,990 B2
(45) Date of Patent: Jul. 9, 2024

(54) ELECTRONIC DEVICE WHICH PREFETCHES APPLICATION AND METHOD THEREFOR

(71) Applicant: Samsung Electronics Co., Ltd., Gyeonggi-do (KR)

(72) Inventors: Hyunjoon Cha, Gyeonggi-do (KR); Chulmin Kim, Gyeonggi-do (KR); Yongtaek Lee, Gyeonggi-do (KR); Ohoon Kwon, Gyeonggi-do (KR); Jaewon Kim, Gyeonggi-do (KR); Sooyong Suk, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 17/432,199

(22) PCT Filed: Feb. 5, 2020

(86) PCT No.: PCT/KR2020/001635
§ 371 (c)(1),
(2) Date: Aug. 19, 2021

(87) PCT Pub. No.: WO2020/171427
PCT Pub. Date: Aug. 27, 2020

(65) Prior Publication Data
US 2023/0135295 A1    May 4, 2023

(30) Foreign Application Priority Data
Feb. 19, 2019    (KR) .......................... 10-2019-0018977

(51) Int. Cl.
G06F 7/06        (2006.01)
G06F 9/48        (2006.01)
G06F 9/54        (2006.01)

(52) U.S. Cl.
CPC .............. *G06F 9/485* (2013.01); *G06F 9/544* (2013.01)

(58) Field of Classification Search
CPC ................................. G06F 9/485; G06F 9/544
See application file for complete search history.

(56) References Cited

U.S. PATENT DOCUMENTS 10,091,344 B2    10/2018    Hwang et al.
10,936,340 B2    3/2021    Lee et al.
(Continued)

FOREIGN PATENT DOCUMENTS

CN    108363593 A    8/2018
EP    2610720 A1    7/2013
(Continued)

OTHER PUBLICATIONS

European Search Report dated Mar. 9, 2022.
(Continued)

*Primary Examiner* — Kevin L Young
*Assistant Examiner* — Abdou K Seye
(74) *Attorney, Agent, or Firm* — Cha & Reiter, LLC

(57) ABSTRACT

In certain embodiments, an electronic device comprises a display; a first memory; a second memory storing a plurality of applications; and a processor, wherein the processor is configured to: switch a screen displayed on the display from a first screen to a second screen, wherein the second screen includes a plurality of objects respectively indicating the plurality of applications; identify applications which are not running among the plurality of applications, in response to the switching to the second screen; and load data of at least one application from the second memory to the first memory, based on a predetermined criteria, before receiving an input selecting the at least one application.

18 Claims, 15 Drawing Sheets

(56) References Cited

U.S. PATENT DOCUMENTS

| | | | |
|---|---|---|---|
| 2004/0111548 A1* | 6/2004 | Arimilli | G06F 9/30116 |
| | | | 712/E9.027 |
| 2005/0086652 A1 | 4/2005 | Tian et al. | |
| 2006/0101341 A1 | 5/2006 | Kelly et al. | |
| 2011/0145362 A1 | 6/2011 | Jones et al. | |
| 2014/0189608 A1* | 7/2014 | Shuttleworth | G06F 3/0485 |
| | | | 715/863 |
| 2014/0304632 A1* | 10/2014 | Ryu | G06F 3/0482 |
| | | | 715/765 |
| 2014/0365861 A1 | 12/2014 | Lasmarias et al. | |
| 2014/0373032 A1* | 12/2014 | Merry | G06F 9/54 |
| | | | 719/328 |
| 2016/0202884 A1* | 7/2016 | Ohki | G06F 3/0482 |
| | | | 715/784 |
| 2016/0357808 A1 | 12/2016 | Morris et al. | |
| 2018/0217736 A1 | 8/2018 | Nam et al. | |
| 2018/0293087 A1 | 10/2018 | Lee et al. | |
| 2019/0281128 A1 | 9/2019 | Zhang et al. | |
| 2019/0384619 A1* | 12/2019 | Leong | G06F 3/0483 |
| 2021/0011609 A1* | 1/2021 | Zhang | G06F 9/451 |
| 2021/0323406 A1* | 10/2021 | So | B60K 35/00 |

FOREIGN PATENT DOCUMENTS

| | | |
|---|---|---|
| EP | 3008592 B1 | 10/2018 |
| JP | 4783291 B2 | 9/2011 |
| KR | 10-2004-0096501 A | 11/2004 |
| KR | 10-2016-0116910 A | 10/2016 |
| KR | 10-2017-0039999 A | 4/2017 |
| KR | 10-2017-0141248 A | 12/2017 |
| KR | 10-2018-0089085 A | 8/2018 |
| KR | 10-2018-0102625 A | 9/2018 |
| WO | 2014/028111 A1 | 2/2014 |

OTHER PUBLICATIONS

Practical Prediction and Prefetch for Faster Access to Applications on Mobile Phones UbiComp'13 Sep. 8-12, 2013,Zurich, Switzerland.

European Search Report dated Jul. 11, 2022.

Korean Office Action dated May 9, 2024.

* cited by examiner

ELECTRONIC DEVICE WHICH PREFETCHES APPLICATION AND METHOD THEREFOR

CROSS REFERENCE TO RELATED APPLICATIONS

This application is a National Phase Entry of PCT International Application No. PCT/KR2020/001635, which was filed on Feb. 5, 2020, and claims a priority to Korean Patent Application No. 10-2019-0018977, which was filed on Feb. 19, 2019, the contents of which are incorporated herein by reference.

TECHNICAL FIELD

Certain embodiments relate to an electronic device which prefetches an application, and an operating method thereof.

BACKGROUND ART

An electronic device may load data stored in a storage into a memory to execute an application. The electronic device may prefetch application data to improve a response time for an application execution request.

Technical Problem

Quickly entering a new application after selection by the user may improve the user experience. However, entering the new application may include fetching of data which can be time-consuming.

Technical problems to be achieved in the disclosure are not limited to the technical problems mentioned above, and other technical problems not mentioned herein can be clearly understood by those skilled in the art to which the disclosure pertains from the following descriptions.

Solution to Problem

In certain embodiments, an electronic device comprises a display; a first memory; a second memory storing a plurality of applications; and a processor, wherein the processor is configured to: switch a screen displayed on the display from a first screen to a second screen, wherein the second screen includes a plurality of objects respectively indicating the plurality of applications; identify applications which are not running among the plurality of applications, in response to the switching to the second screen; and load data of at least one application from the second memory to the first memory, based on a predetermined criteria, before receiving an input selecting the at least one application.

According to certain embodiments, a method comprises: switching a screen displayed on a display of the electronic device from a first screen to a second screen, wherein the second screen includes a plurality of objects respectively indicating the plurality of applications; identifying applications which are not running among the plurality of applications, in response to the switching to the second screen; selecting at least one application from among the identified applications, based on a predetermined criteria; and loading data of the at least one application stored in the second memory of the electronic device to the first memory of the electronic device.

Advantageous Effects

According to certain embodiments, an electronic device and a method thereof can improve entry into a new application selected by the user by efficiently prefetching by selecting an application to be prefetched based on the prefetch efficiency.

Advantages acquired in the disclosure are not limited to the aforementioned advantages. Other advantages not mentioned herein can be clearly understood by those skilled in the art to which the disclosure pertains from the following descriptions.

DETAILED DESCRIPTION

An electronic device can include numerous applications for the user. When the user selects an application, it may be time consuming for the electronic device to enter the application. To improve entry time, the electronic device may select an application among a plurality of applications to be prefetched by prefetching data of the selected application. However, in order to significantly improve entry time, the prefetch operation should be efficient.

Figure 1:
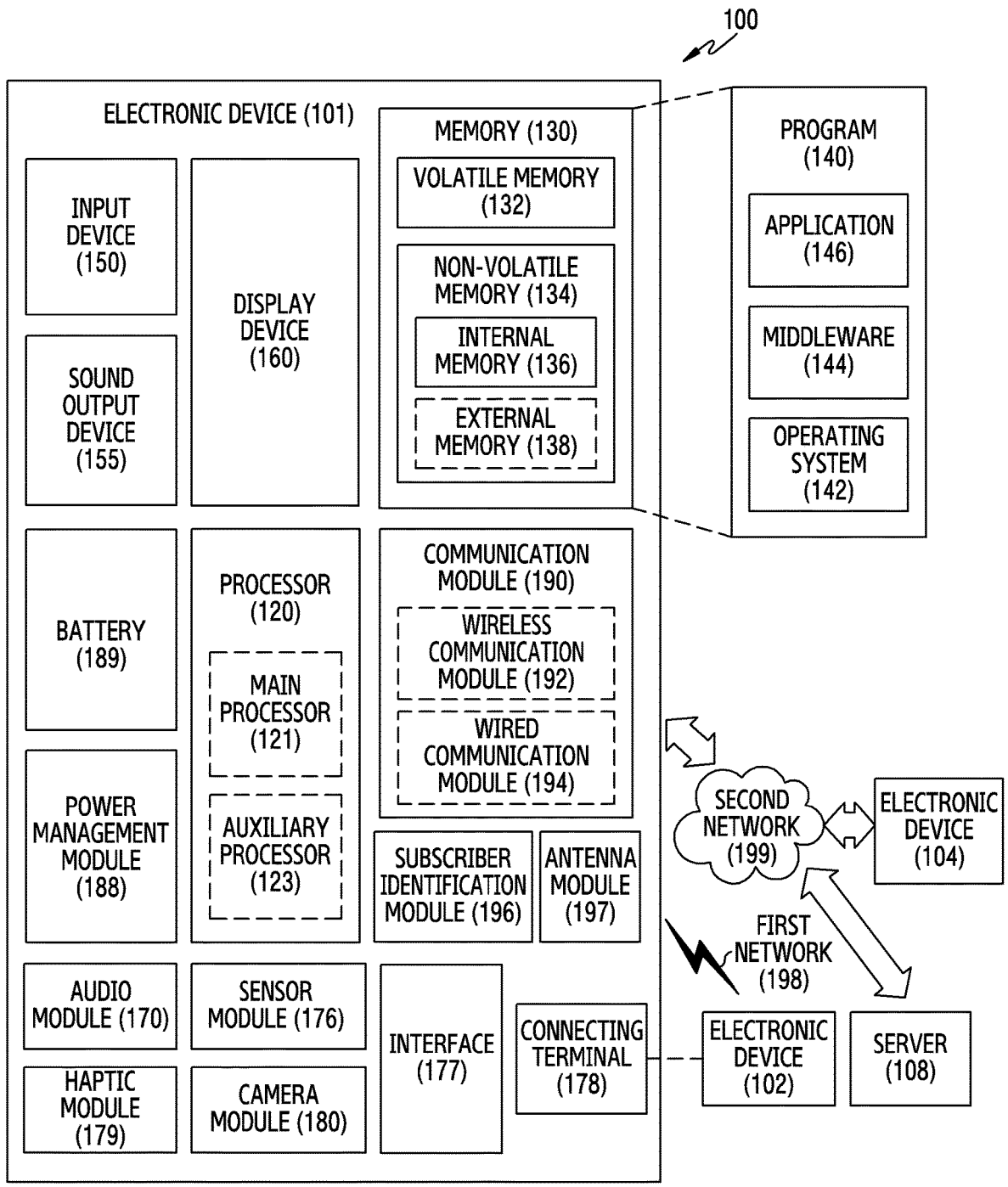
FIG. 1 is a block diagram of an electronic device in a network environment according to certain embodiments.

FIG. 1 describes an electronic device which may provide numerous applications for the user.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

As used herein, "processor" shall refer to both the singular and plural contexts.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The electronic device 101 may provide numerous applications for the user. The applications and associated data can be stored in the non-volatile member 134, either in the internal memory 136 or the external memory 138.

The user may select one of the numerous applications for execution by making a touch input display device 160, among other ways. The display device 160 can display an object, such as an icon, corresponding to each application. The user can select an application for execution by, among other ways, touching the icon corresponding thereto. In certain embodiments, the user can select an application by making a voice command. When an application is selected for execution, the application (or at least a portion, thereof) and associated data are transferred to the volatile memory 132, which may allow faster access by the processor 120.

Figure 2:
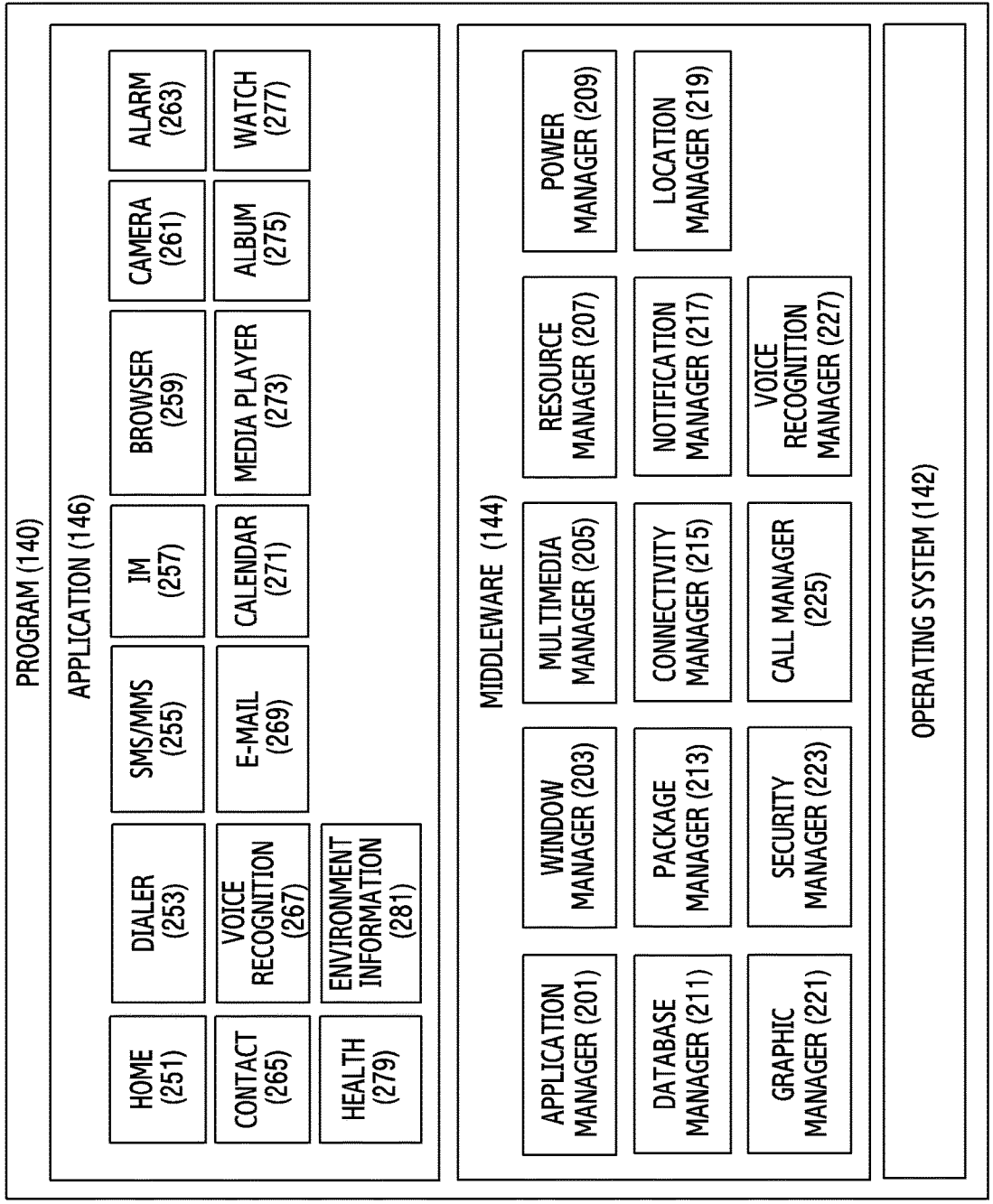
FIG. 2 illustrates an exemplary configuration of an electronic device according to certain embodiments.

However, transferring the application/portion thereof (now collectively referred to as application) and associated data to the volatile memory can be time-consuming and during this time, the application may not be available for the user to use. This can cause an unpleasant pause before the user can utilize the functions of the application. FIG. 2 shows a plurality of applications.

FIG. 2 is a block diagram 200 illustrating a program 140 according to certain embodiments of the present disclosure. According to an embodiment, the program 140 may include an operating system 142 for controlling one or more resources of the electronic device 101, a middleware 144 or an application 146 running on the operating system 142. The operating system 142 may include, for example, Android™, iOS™, Windows™, Symbian™, Tizen™, or Bada™. At least a part of the program 140 may be preloaded on the electronic device 101 or may be downloaded from an external electronic device (e.g., the electronic device 102 or 104, or the server 108).

The operating system 142 may control a management (e.g., allocation or retrieval) of one or more resources (e.g., a process, a memory or a power). Alternatively or additionally, the operating system 142 may include one or more driver programs for driving another hardware device of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 so that a function or information provided from one or more resources is used by the application 146. According to an embodiment of the present disclosure, the middleware 144 may include an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a call manager 225, or a voice recognition manager 227.

The application manager 201 may mange, for example, a life cycle of the application 146. The window manager 203 may manage a GUI resource used in a screen. The multimedia manager 205 may recognize a format required for playing various media files and may encode or decode a media file using a codec matched to the format. The resource manager 207 may manage a source code of the application 146 or a storage space of the memory 130. The power manager 209, for example, may manage a capacity, a temperature or a power of the memory 130, and may determine or provide related information required for operating the electronic device 101 using corresponding information. According to an embodiment, the power manager 209 may operate together with a basic input/output system (BIOS).

The database manager 211 may generate, search, or modify a database to be used in the application 146. The package manager 213 may manage installation or update of an application distributed in a package file format. The connectivity manger 215 may manage wireless connection or direct connection between the electronic device 101 and an external electronic device. The notification manager 217 may provide a function for notifying an occurrence of the predetermined event (e.g., incoming call, message, or alert) to a user. The location manager 219 may manage location information of the electronic device 101. The graphic manager 221 may manage a graphic effect to be provided to a user or a user interface related thereto.

The security manager 223 may provide various security functions required for system security or user authentication. The telephony manager 225, for example, may manage a voice or video call function provided by the electronic device 101. The voice recognition manager 227, for example, may transmit audio data of a user to the server 108, and may receive command corresponding to a function to be performed by the electronic device 101 based on at least a part of the audio data or text data transformed based on at least a part of the audio data. According to an embodiment, the middleware 144 may delete a part of existing elements or may add new elements dynamically. According to an embodiment, at least a part of the middleware 144 may be included in a part of the operating system 142 or may be implemented as other software different from the operating system 142.

The application 146, for example, may include at least one application capable of performing functions such as a home 251, a dialer 253, an SMS/MMS 255, an instant message (IM) 257, a browser 259, a camera 261, an alarm 263, a contact 265, a voice recognition 267, an e-mail 269, a calendar 271, a media player 273, an album 275, a watch 277, a health 279 (e.g., measure biometric information such as an exercise amount or blood sugar), or environmental information 281 (e.g., measure air pressure, humidity, or temperature information). According to an embodiment of the present disclosure, the application 146 may include an information exchange application for supporting information exchange between the electronic device 101 and an external electronic device. The information exchange application may include, for example, a notification relay application for relaying specific information (e.g., call, message, or alert) to the external electronic device or a device management application for managing the external electronic device. For example, the notification relay application may have a function for relaying, to an external electronic device, notification information generated in another application (e.g., the e-mail application 269) of the electronic device 101. Alternatively or additionally, the notification relay application may receive notification information from the external electronic device and may provide the received notification information to the user.

The device management application, for example, may manage a power (e.g., turn-on or turn-off) of an external electronic device communicating with the electronic device 101 or some elements thereof (e.g., the display device 160 or the camera module 180), or a function (e.g., brightness, resolution, or focus of the display device 160 or the camera module 180). Alternatively or additionally, the device management application may install, delete, or update an application running on the external electronic device.

Figure 3:
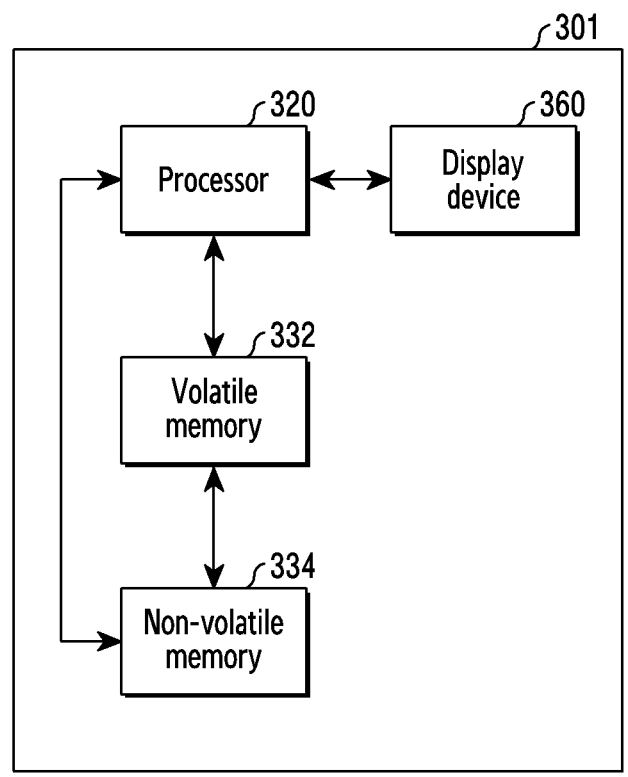
FIG. 3 is a block diagram of an electronic device according to certain embodiments.

Referring to FIG. 3, a user may select one of the numerous applications for execution by making a touch input display device 360 or voice command, among other ways. When an application is selected for execution, the processor 320 transfers the application and associated data from a non-volatile memory 334 to a volatile memory 332, which may allow faster access by the processor 320 for execution.

However, transferring the application and/or associated data to the volatile memory can be time-consuming and the application may be unavailable for the user to use. To allow the user to use the application quicker, the processor 320 can prefetch the application and/or associated data from the non-volatile memory 334 and store to the volatile memory 332 at a point in time where the user is likely to select the application, but before the user actually selects the application. Thus, when the user does select the application, the application and/or associated data are already in the volatile memory 332.

In certain embodiments, the processor 320 can prefetch applications with a prefetch command that is separate and distinct from the command for fetching the application when the user selects the application. Moreover, the processor 320 can determine which applications to prefetch using a predetermined criteria.

The predetermined criteria may be based on a variety of factors. The factors can include, among others, whether or not an icon associated with the application is on the screen, execution information for the application, context information, recency of usage information, and prefetch efficiency. In certain embodiments, different weights may be applied to the foregoing, resulting in score, wherein a score above a certain amount results in prefetching the application. In certain embodiments, machine learning can be used to determine which application to prefetch. The score can indicate, at least in part, the likelihood that the user will select the application for execution within a predetermined period of time.

Additionally, the prefetching can include certain files of the application and data associated therewith up to a particular maximum, such as 100 MB.

FIG. 3 is a block diagram of an electronic device 301 according to certain embodiments. The electronic device 301 according to certain embodiments of the FIG. 3 may be the same at least in part as the electronic device 101 of FIG. 1.

Referring to FIG. 3, in certain embodiments, the electronic device 301 may include a processor 320, a volatile memory 332, a non-volatile memory 334, or a display device 360. In certain embodiments, the processor 320 may correspond to the processor 120 of FIG. 1. In certain embodiments, the volatile memory 332 may correspond to the volatile memory 132 of FIG. 1. In certain embodiments, the non-volatile memory 334 may correspond to the non-volatile memory 134 of FIG. 1. In certain embodiments, the display device 360 may correspond to the display device 160 of FIG. 1.

In certain embodiments, the processor 320 may load application data (e.g., an Application Packages (APK) file) for applications stored in the non-volatile memory 134 into the volatile memory 332, and may execute the application, based on the application data loaded into the volatile memory 332. In certain embodiments, the processor 320 may load application data for an application corresponding to an application execution command among application data for each of a plurality of applications stored in the non-volatile memory 134 into the volatile memory 332 to execute the application, based on the application execution command.

In certain embodiments, the processor 320 may select some applications from among the plurality of applications on the basis of a predetermined criterion, and may load data for the selected application into the volatile memory 332. In certain embodiments, based on a prefetch start command which is distinctive from the application execution command, the processor 320 may select some applications from among the plurality of applications on the basis of a predetermined criterion, and may store the data for the selected application in the volatile memory 332.

In certain embodiments, the processor 320 may select a prefetch target application, based on at least one of whether an executable object (e.g., an icon or a widget) included in a screen being displayed on the display device 360 indicates an application, execution information for the application, and context information. In certain embodiments, the processor 320 may select some applications from among a plurality of applications on the basis of a prefetch order of an application based on recent usage information (e.g., a Least Recently Used (LRU) list) of applications, a prefetch order of an application based on a Machine Learning (ML), or a combination thereof. Descriptions on certain embodiments of the operation of selecting the prefetch target application will be described below.

In certain embodiments, the processor 320 may load data of a pre-set size (e.g., 100 Mega Byte (MB)) among application data for the prefetch target application into the volatile memory 332. In certain embodiments, the data of the pre-set size may include data required to configure an initial screen of an application among the entire data for the application. In certain embodiments, if the data required to configure the initial screen of the prefetch target application is less than or equal to the pre-set size, the processor 320 may load the data into the volatile memory 332 as much as the data required to configure the initial screen of the prefetch target application. In certain embodiments, if the data required to configure the initial screen of the prefetch target application exceeds the pre-set size, the processor 320 may load data corresponding to the pre-set size into the volatile memory 332 among data required to configure the initial screen of the prefetch target application, based on data access information. In certain embodiments, if the data required to configure the initial screen of the prefetch target application exceeds the pre-set size, the processor 320 may select some files from among a plurality of files constituting application data. In certain embodiments, the processor 320 may load data for the selected some files into the volatile memory 332. In certain embodiments, a total sum of sizes of data for the selected some files may be less than or equal to the pre-set size. In certain embodiments, the processor 320 may preferentially select a file having a pre-set extension from among a plurality of files as a file to be loaded into the volatile memory 332. In certain embodiments, the processor 320 may select the file to be loaded into the volatile memory 332 in a descending order of a size of required data for each file from among a plurality of files, based on the data access information. However, the disclosure is not limited thereto.

In certain embodiments, when data for the selected application is loaded into the volatile memory 332, a file page of the volatile memory 332 may increase. In certain embodiments, data in a page unit of the application data loaded into the volatile memory 332 for the prefetch of the application may be referred to as a file page. In certain embodiments, the prefetch may be an operation of generating data of a file expected to be used by an application as the file page and loading it on the volatile memory 332.

In certain embodiments, the processor 320 may identify a logical address space allocated to an application process of an application being executed. In certain embodiments, the processor 320 may identify a plurality of physical address corresponding to a plurality of logical addresses of the logical address space allocated to the application process. In certain embodiments, the processor 320 may identify information of files of application data mapped to the plurality of physical addresses. In certain embodiments, the information of files may include at least one of a file name including directory information, and offset information of the file. In certain embodiments, the offset information of the file may be information indicating at least one piece of sub-data among sub-data in a pre-set unit (e.g., a page unit) constituting the file. In certain embodiments, data access information may include information of the files.

In certain embodiments, the processor 320 may load data of a set size (e.g., 100 MB) into the volatile memory 332 among application data for the prefetch target application, based on the data access information. In an embodiment, the data access information of the application may include information on data accessed when the processor 320 previously executes the application. In certain embodiments, when the application is first executed, the processor 320 may identify data to be loaded into the volatile memory 332 from the non-volatile memory 334 among application data for the application, and may store information on the identified data into the non-volatile memory 334 as the data access information.

In certain embodiments, the processor 320 may capture (or look up) a logical address space of a process for executing the application. In certain embodiments, the processor 320 may identify information on data (e.g., data in a page unit) indicated by each of logical addresses of the logical address space of the process for executing the application. In certain embodiments, the processor 320 may identify a file indicated by data. In certain embodiments, the processor 320 may identify a physical address of data. In certain embodiments, the processor 320 may identify a physical address corresponding to the logical address of data, based on a table for mapping the logical address and the physical address. In certain embodiments, the processor 320 may identify information of files of application data mapped to a plurality of physical addresses. In certain embodiments, the processor 320 may store the identified information of files by processing it as the data access information. In certain embodiments, the information of files may include at least one of a file name including directory information, and offset information of the file. In certain embodiments, the offset information of the file may be information indicating at least one piece of sub-data among sub-data in a pre-set unit (e.g., a page unit) constituting the file. In certain embodiments, the data access information may include information of the files.

In certain embodiments, the processor 320 may load application data of the prefetch target application into the volatile memory 332. In certain embodiments, the application data may include a file (e.g., APK, Dalvik Executable Format (DEX), Optimized DEX (ODEX)) including at least part of an application package file and/or an application execution code. Additionally, in certain embodiments, the processor 320 may identify a position of a file to which an application accesses through a set command (e.g., $ adb shell cat/proc/PID/fd).

In certain embodiments, the processor 320 may generate a prefetch start command in response to switching of a screen being displayed on the display device 360 to a different screen. In certain embodiments, the processor 320 may generate a prefetch interrupt (or end) command for interrupting a prefetch for an application selected based on a previously displayed screen, in response to switching of the screen being displayed on the display device 360 to the different screen. In certain embodiments, the processor 320 may generate a prefetch resume command for resuming the prefetch for the application selected based on the previously displayed screen, in response to resuming of the different screen being displayed on the display device 360 to the previous screen. In certain embodiments, the processor 320 may generate a prefetch command based on a re-switched screen in response to re-switching of the different screen being displayed on the display device 360 to the previous screen.

In certain embodiments, the processor 320 may restore an area of the volatile memory 332, occupied by data for a non-executed application among applications of which data is loaded into the volatile memory 332, based on the prefetch start command. In certain embodiments, the processor 320 may restore the area of the volatile memory 332, occupied by the data of the non-executed application, thereby loading different data into the restored area.

In certain embodiments, when data of the prefetch target application is loaded into the volatile memory 332, the processor 320 may execute a set effect (e.g., shaking an object) on executable objects representing the prefetch target application. In certain embodiments, upon receiving an input for executing the prefetch target application of which data is loaded into the volatile memory 332, the processor 320 may execute a set effect (e.g., displaying a text object "prefetch hit") in a screen being displayed on the display device 360. In certain embodiments, the processor 320 may execute the prefetch target application corresponding to the input after executing the set effect in the screen being displayed on the display device 360.

Figure 4:
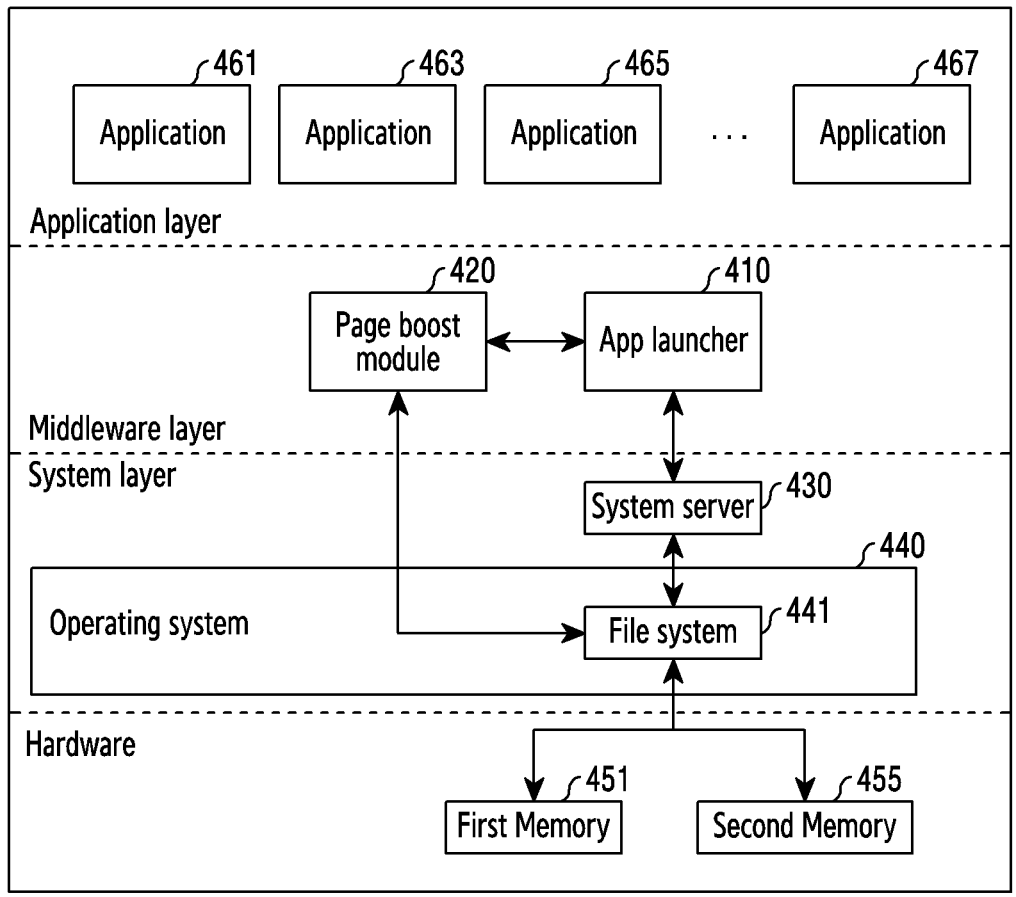
FIG. 4 is a block diagram illustrating an exemplary configuration of an electronic device according to certain embodiments.

Referring to FIG. 4, an app launcher 410 can generate screens of icons representing the applications 461, 463, 465, 467. When the number of icons exceeds the number that can displayed at one time on the display device 360, the app launcher 410 can generate successive additional screens, each of which include some portion of a plurality of icons representing the plurality of applications 461, 463, 465, 467.

Screens can be displayed like pages. That is, as part of a series, each of which substantially consume the entirety of the display device 360 and are displayed as a non-scrollable discrete unit at a given time. The user can change or switch a first screen that is displayed by dragging the screen across the display causing a second screen in the series to be displayed.

When the app launcher 410 causes the display device 360 to display a second screen, the app launcher 410 provides a page boost module 420 with information about the applications referenced by the icons on the second page. The page boost module 420 can determine which ones of applications referenced by the icons to prefetch from a second memory 455 to a first memory 451.

FIG. 4 is a block diagram illustrating a configuration of an electronic device (e.g., the electronic device 301 of FIG. 3) according to certain embodiments. Configurations of an application layer, middleware layer, or system layer of FIG. 4 may be the same at least in part as the program 140 of the electronic device 101 of FIG. 1. The configuration of FIG. 4 will be described with reference to the configurations of the electronic device 301 of FIG. 3.

An electronic device (e.g., the electronic device 301 of FIG. 3) may include at least one of an application layer, a middleware layer, a system layer, and a hardware. In certain embodiments, the application layer may include a plurality of applications 461 to 467. The middleware layer may include at least one of an app launcher 410 and a page boost module 420. The system layer may include a system server 430 and an operating system 440 having a file system 441. The hardware may include at least one of a first memory 451 and a second memory 455.

In certain embodiments, at least one of the plurality of applications 461 to 467, the app launcher 410, the page boost module 420, the system server 430, the file system 441, and the operating system 440 may be included in the program 140 of FIG. 1. In certain embodiments, the plurality of applications 461 to 467 of the application layer of FIG. 4 may be included in the application 146 of the program 140 of FIG. 1 or FIG. 2. In certain embodiments, the app launcher 410 or page boost module 420 of the middleware layer of FIG. 4 may be included in the middleware 144 of the program 140 of FIG. 1 or FIG. 2. In certain embodiments, the system server 430 and the operating system 440 of the file system 441 of the system layer of FIG. 4 may be included in the operating system 142 of the program 140 of FIG. 1 or FIG. 2. In certain embodiments, the first memory 451 may correspond to the volatile memory 132 of FIG. 1 or the volatile memory 332 of FIG. 3. In certain embodiments, the second memory 455 may correspond to the non-volatile memory 134 of FIG. 1 or the non-volatile memory 334 of FIG. 3.

In certain embodiments, the app launcher 410 may request the system server 430 to display screens (e.g., a home screen, an apps screen) provided in the app layer 410 by the display device 360 of the electronic device 301 and to execute applications (e.g., at least one of a plurality of applications 461 to 467) indicated by an executable object, based on an input (e.g. a touch) for the executable object (e.g., an icon) included in the screen. A "screen" as used in the displayed content context shall be understood to include a graphic that can be part of a series, each of which substantially consume the entirety of the display device 360 and is displayed as a non-scrollable discrete unit at a given time. In certain embodiments, when the application (e.g., the application 461) indicated by the executable object is executed, the app launcher 410 may transfer information indicating that the application (e.g., the application 461) is executed to the page boost module 420. In certain embodiments, the page boost module 420 may update recent usage information (e.g., update an LRU list), based on the information indicating that the application (e.g., the application 461) is executed.

In certain embodiments, the app launcher 410 may generate a second screen, in response to an input for screen switching (e.g., a touch input or drag on the display device 360) from a first screen (e.g., at least one of a home screen, an apps screen, and a folder entry screen) being displayed by the display device 360 of the electronic device 301 to the second screen (e.g., at least one of a home screen, an apps screen, and a folder entry screen). In certain embodiments, the app launcher 410 may provide the page boost module 420 with information on applications indicated by the executable objects included in the second screen, in response to the input for screen switching to the second screen. In certain embodiments, it may be understood that the information provided by the app launcher 410 to the page boost module 420 indicates a command for executing a prefetch.

In certain embodiments, information on applications may include at least one of information indicating whether an application is running, information indicating the number of times of executing the application, information indicating the number of times of notifying the application, and information indicating an order depending on a recent usage of applications. In certain embodiments, a running state of the application may refer to a state in which application data for executing the application is loaded into the first memory 451 from the second memory 455, and an execution state of the application may refer to a state in which the processor 320 processes a pre-set process requested by the application in foreground or background by using the application data loaded into the first memory 451.

In certain embodiments, the page boost module 420 may identify applications which are not running among applications indicated by executable objects included in the changed (or switched) second screen, based on information on applications provided from the app launcher 410.

In certain embodiments, the page boost module 420 may compute prefetch values of the applications which are not running. In certain embodiments, the page boost module 420 may compute the prefetch values, based on at least one of information on applications, context information, application execution information, and predetermined prefetch efficiency. In certain embodiments, the prefetch value may be a reference value for selecting a prefetch target application. In certain embodiments, the prefetch value may be a reference value for determining a prefetch order among a plurality of applications selected as a prefetch target.

In certain embodiments, the page boost module 420 may determine whether each of the applications which are not running is prefetched, based on the computed prefetch values. In certain embodiments, the page boost module 420 may determine a predetermined number of applications among the applications which are not running, as the prefetch application(s), based on the computed prefetch values. In certain embodiments, the predetermined number may be predetermined based on a size of an area allocated in the first memory 451. For example, if the size of the area allocated in the first memory 451 is 1 Giga Byte (GB) and a size of data prefetched in application data of the prefetch target application is 100 Mega Byte (MB), the predetermined number may be 10.

In certain embodiments, the page boost module 420 may sequentially load the application data for the prefetch target application into the first memory 451, based on the computed prefetch values. In certain embodiments, when the application data for the prefetch target application is loaded into the first memory 451, the page boost module 420 may provide the app launcher 410 with information on the prefetched application. In certain embodiments, the app launcher 410 may execute a set effect (e.g., shaking an object) on executable objects representing the prefetched application.

In certain embodiments, the page boost module 420 may extract data of a set size (e.g., 100 MB) among application data stored in the second memory 455 for the prefetch target application, and may load the data into the first memory 451. In certain embodiments, the data of the set size among the application data may be determined based on data access information. In certain embodiments, if the application data is less than the set size, the page boost module 420 may extract the entirety of the application data and load the data into the first memory 451. In certain embodiments, the data access information may include information indicating data necessary to configure an initial screen of an arbitrary application, when the arbitrary application is executed through the processor 320.

Figure 5:
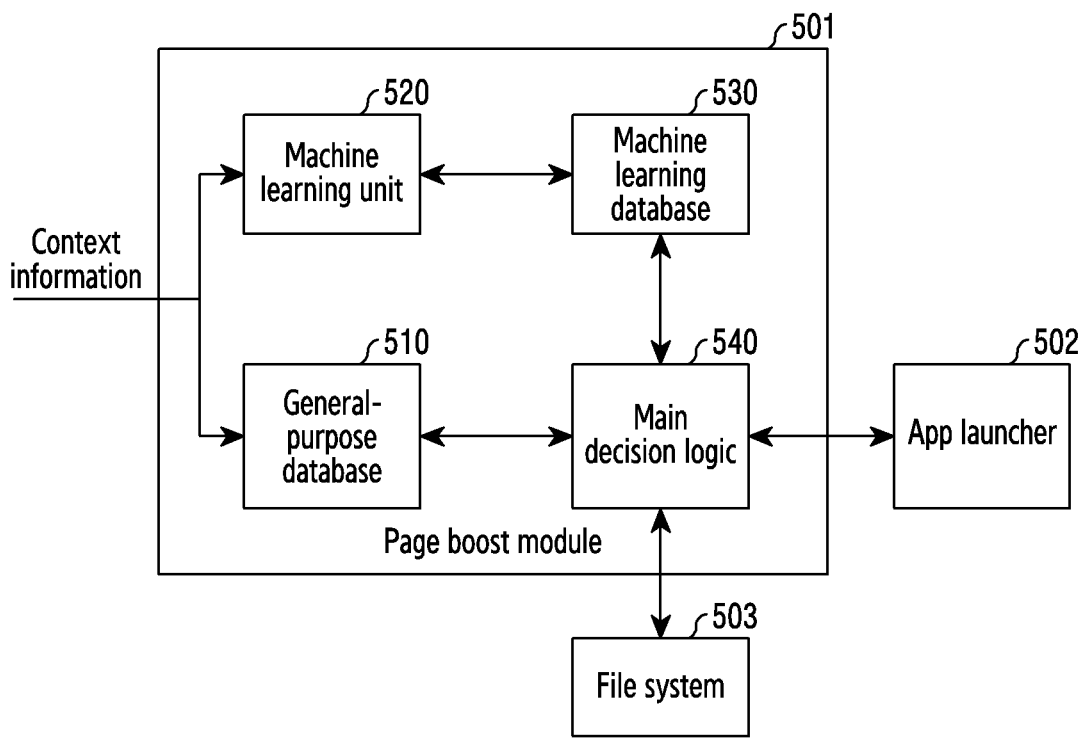
FIG. 5 illustrates an exemplary configuration of a page boost module of an electronic device according to certain embodiments.

Referring to FIG. 5, the page boost module 501 can use machine learning to determine which applications to prefetch. For example, machine learning can be used to detect a usage tendency of a user to open applications in a particular order. For example, the page boost module 501 may detect that in the morning, at a particular time, the user reads the news, checks their bank accounts, and looks at their investments. Accordingly, when the news application is opened, the page boost module 501 may prefetch the bank app and investment app. In another embodiment, the page boost module 501 may prefetch a payment app when a GPS module indicates that the user is entering a retail store.

According to certain embodiments, statistical records can be kept for each application of the subsequent applications that are launched. When the statistical records indicate that a second application is opened a high enough percentage of times following a first application, the page boost module 501 can prefetch the second application when the first application is opened.

Figure 6:
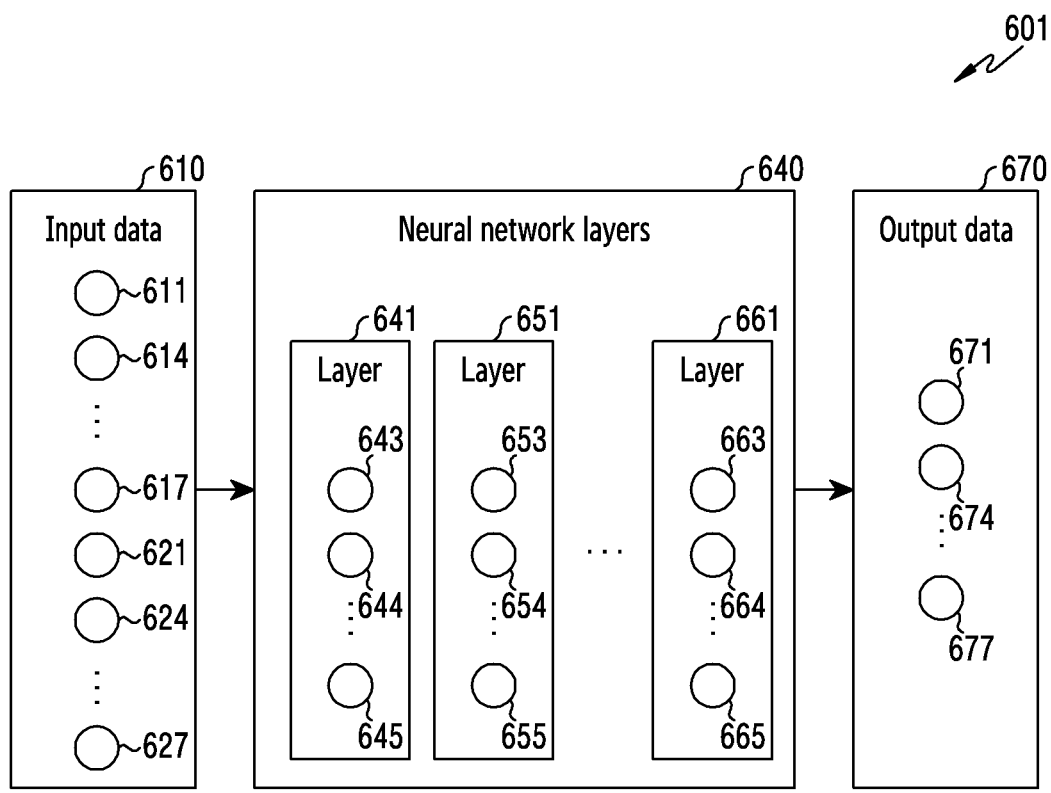
FIG. 6 is a block diagram illustrating an exemplary configuration of a machine learning of an electronic device according to certain embodiments.

FIG. 5 illustrates an exemplary configuration of a page boost module 501 of an electronic device (e.g., the electronic device 301) according to certain embodiments. FIG. 6 is a block diagram 601 illustrating an exemplary configuration of a machine learning of an electronic device (e.g., the electronic device 301) according to certain embodiments. The page boost module 501, app launcher 502, and file system 503 of FIG. 5 may respectively correspond to the page boost module 420, app launcher 410, and file system 441 of FIG. 4. The configuration of FIG. 5 will be described with reference to the configurations of the electronic device 301 of FIG. 3. The configuration of FIG. 6 will be described with reference to a machine learning unit 520 or machine learning database 530 of FIG. 5.

Referring to FIG. 5 and FIG. 6, in certain embodiments, the page boost module 501 may include a general-purpose database 510, the machine learning unit 520, the machine learning database 530, or a main decision logic 540. Although it is illustrated in FIG. 5 and FIG. 6 that the page boost module 501 includes at least one of the general-purpose database 510, the machine learning unit 520, the machine learning database 530, and the main decision logic 540, this is for exemplary purposes only, and thus the page boost module 501 may include various logics, circuits, or a combination thereof for selecting a prefetch target application. In certain embodiments, at least one of the general-purpose database 510 and machine learning database 530 of the page boost module 501 may be configured individually.

In certain embodiments, the general-purpose database 510 may include at least one of information on applications such as information indicating whether an application is running, information indicating the number of times of executing the application, information indicating the number of times of notifying the application, information indicating an order depending on a recent usage of applications, information on applications indicated by executable objects included in a screen, and information on prefetch efficiency of the application. In certain embodiments, the general-purpose database 510 may update the information on applications, based on context information which is input from the outside. In certain embodiments, the context information may include at least one of a current time, a position, user information (e.g., age, gender), application execution information, and prefetch hit information. In certain embodiments, the application execution information may include at least one of information indicating an application executed based on an input, data access information indicating data accessed through the processor 320 among application data when the application is executed, application entry time information, and notification information on the application. In certain embodiments, the prefetch hit information may include information indicating whether an application indicated by data maintained in the first memory 451 in a prefetched state is executed by an input.

In certain embodiments, the general-purpose database 510 may include recent usage information on each of a plurality of screens. In certain embodiments, the recent usage information on each of the plurality of screens may indicate an order depending on an execution history of applications indicated by an executable object included in each of the plurality of screens. In certain embodiments, in the recent usage information on each of the plurality of screens, IDentifiers (IDs) of applications may have been sorted according to the order depending on the execution history of the applications.

In certain embodiments, a processor (e.g., the processor 320 of FIG. 3) may process information stored in the general-purpose database 510 into data of a pre-set data structure through an arbitrary process. In certain embodiments, the processor 320 may store the data of the pre-set data structure in the first memory 451 through the arbitrary process. In certain embodiments, when the data of the pre-set data structure stored in the first memory 451 is modified (or edited), the processor 320 may update information stored in the general-purpose database 510, based on the modified (or edited) data, through the arbitrary process. In certain embodiments, upon identifying a power-off event and/or a rebooting event, the processor 320 may update information stored in the general-purpose database 510, based on the data of the pre-set data structure stored in the first memory 451, through the arbitrary process. In certain embodiments, the arbitrary process may refer to various processes performed in each of configurations of FIG. 4. In certain embodiments, the arbitrary process may refer to various processes performed in a program (e.g., the program 140 of FIG. 1).

In certain embodiments, the machine learning unit 520 may adjust a weight of nodes 643 to 645, 653 to 655, or 663 to 665 of layers 641, 651, or 661 constituting neural network layers 640, so that output data 670 obtained by computing input data 610 through the neural network layers 640 indicates desired data. In certain embodiments, an operation in which the machine learning unit 520 adjusts the weight of the nodes 643 to 645, 653 to 655, or 663 to 665 of the layers 641, 651, or 661 constituting the neural network layers 640 may be referred to as a learning. In certain embodiments, if a difference between the output data 670 and the desired data is less than or equal to a set reference difference, the machine learning unit 520 may interrupt the learning for the neural network layers 640. In certain embodiments, the machine learning unit 520 may transfer information on the neural network layers 640 of which the learning is interrupted to the machine learning database 530.

In certain embodiments, the machine learning unit 520 may start learning for new neural network layers or resume learning for the existing neural network layers when a set condition is satisfied. In certain embodiments, the set condition may include at least one of a pre-set cycle, installation or deletion of an application, or a change of executable objects included in the screen.

In certain embodiments, the input data 610 may include elements 611, 614, or 617 indicating context information and elements 621, 624, or 627 indicating information on applications indicated by executable objects included in a screen among all applications. In certain embodiments, the elements 611, 614, or 617 may have a value indicating a current time, a position, or user information (e.g., age, gender). In certain embodiments, the elements 621, 624, or 627 may have a set value (e.g., '1') for an application indicated by the executable object included in the screen, and may have another set value (e.g., '0') for an application not indicated by the executable object included in the screen.

In certain embodiments, each of elements 671, 674, or 677 of the output data 670 may have a value indicating an execution probability of a corresponding application. In certain embodiments, each of the elements 671, 674, or 677 may have a value greater than or equal to 0 and less than or equal to 1.

In certain embodiments, the machine learning database 530 may include information on the neural network layers 640, received from the machine learning unit 520. In certain embodiments, the machine leaning database 530 may include information on the plurality of neural network layers 640, received from the machine learning unit 520.

In certain embodiments, the main decision logic 540 may determine the prefetch target application by using the general-purpose database 510, the machine learning database 530, or a combination thereof. In certain embodiments, the main decision logic 540 may compute prefetch values for applications indicated by executable objects included in a screen by using the general-purpose database 510, the machine learning database 530, or the combination thereof, and may determine the prefetch target application, based on the computed prefetch values. In certain embodiments, the main decision logic 540 may determine the prefetch target application, based on a prefetch execution command received from the app launcher 502. In certain embodiments, the prefetch execution command may include information on applications indicated by executable objects included in the screen.

In certain embodiments, the main decision logic 540 may determine the prefetch target application, based on recent usage information on a changed (or to-be-changed) screen among a plurality of screens. In certain embodiments, the main decision logic 540 may refer to the recent usage information on the changed (or to-be-changed) screen to identify an order depending on an execution history of applications indicated by an executable object included in the changed (or to-be-changed) screen. In certain embodiments, the main decision logic 540 may determine the prefetch target application, based on the order depending on the execution history of the applications indicated by the executable object included in the changed (or to-be-changed) screen. In certain embodiments, the main decision logic 540 may determine a predetermined number of applications as the prefetch target application, based on the order depending on the execution history of the applications.

In certain embodiments, the main decision logic 540 may load application data for the prefetch target application into the first memory 451 through the file system 503.

Returning to FIG. 4, in certain embodiments, in response to an application execution request from the app launcher 410, the system server 430 may load the application data for the application into the first memory 451 through the file system 503, and may execute an application indicated by the loaded data. In certain embodiments, the application may be executed in the application layer.

In certain embodiments, when data of the application corresponding to the application execution request from the app launcher 410 is loaded into the first memory 451 through the prefetch, the system server 430 may not load the application data for the application into the first memory 451 through the file system 503. In certain embodiments, the system server 430 may execute the application by using the data of the application loaded into the first memory 451 through the prefetch.

In certain embodiments, the operating system 440 may include the file system 441. In certain embodiments, the operating system 440 may be a program for a hardware control, based on data from the application layer. In certain embodiments, the file system 441 may be a program for managing data (e.g., a plurality of files) stored in the first memory 451 or the second memory 455.

In certain embodiments, the data stored in the first memory 451 or second memory 455 may be managed through the file system 441. In certain embodiments, the page boost module 420 or the system server 430 may manage data loaded into the first memory 451 through the file system 441.

Figure 7:
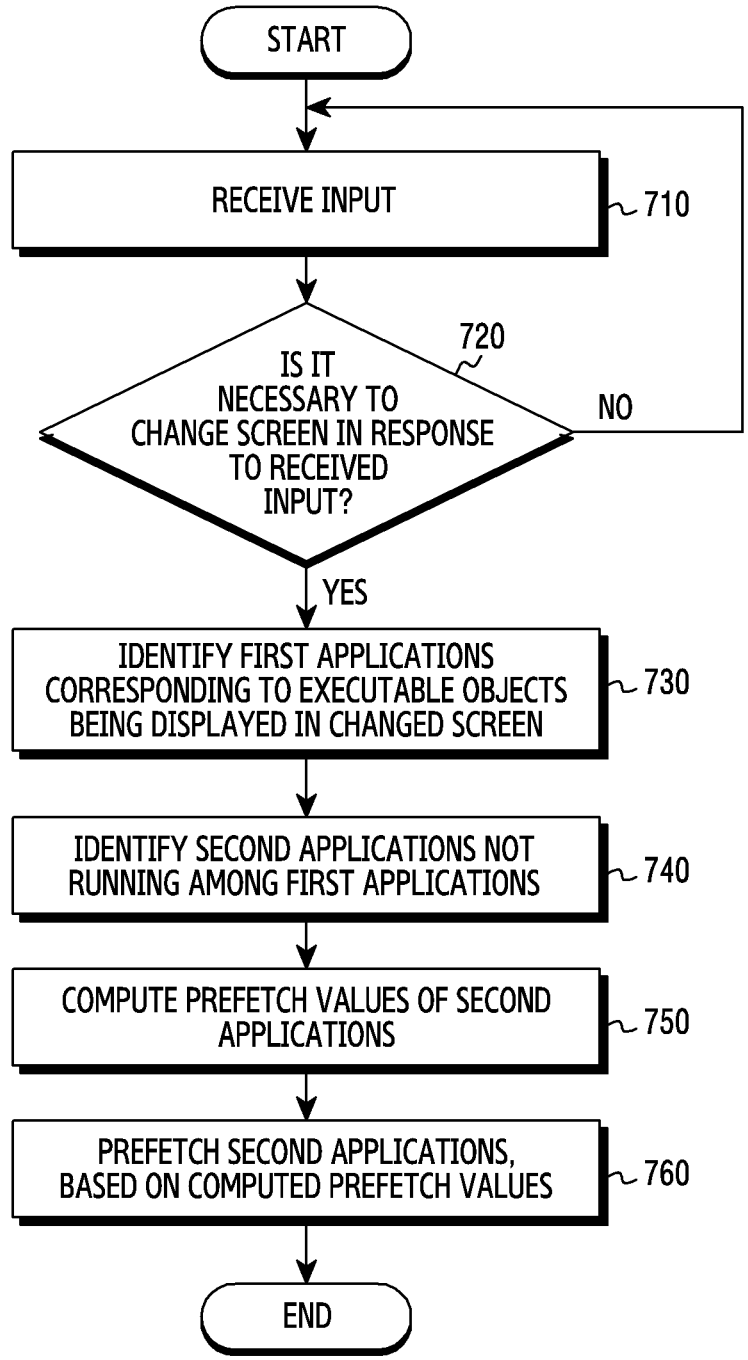
FIG. 7 is a flowchart illustrating a prefetch of an electronic device according to certain embodiments.
Figure 8:
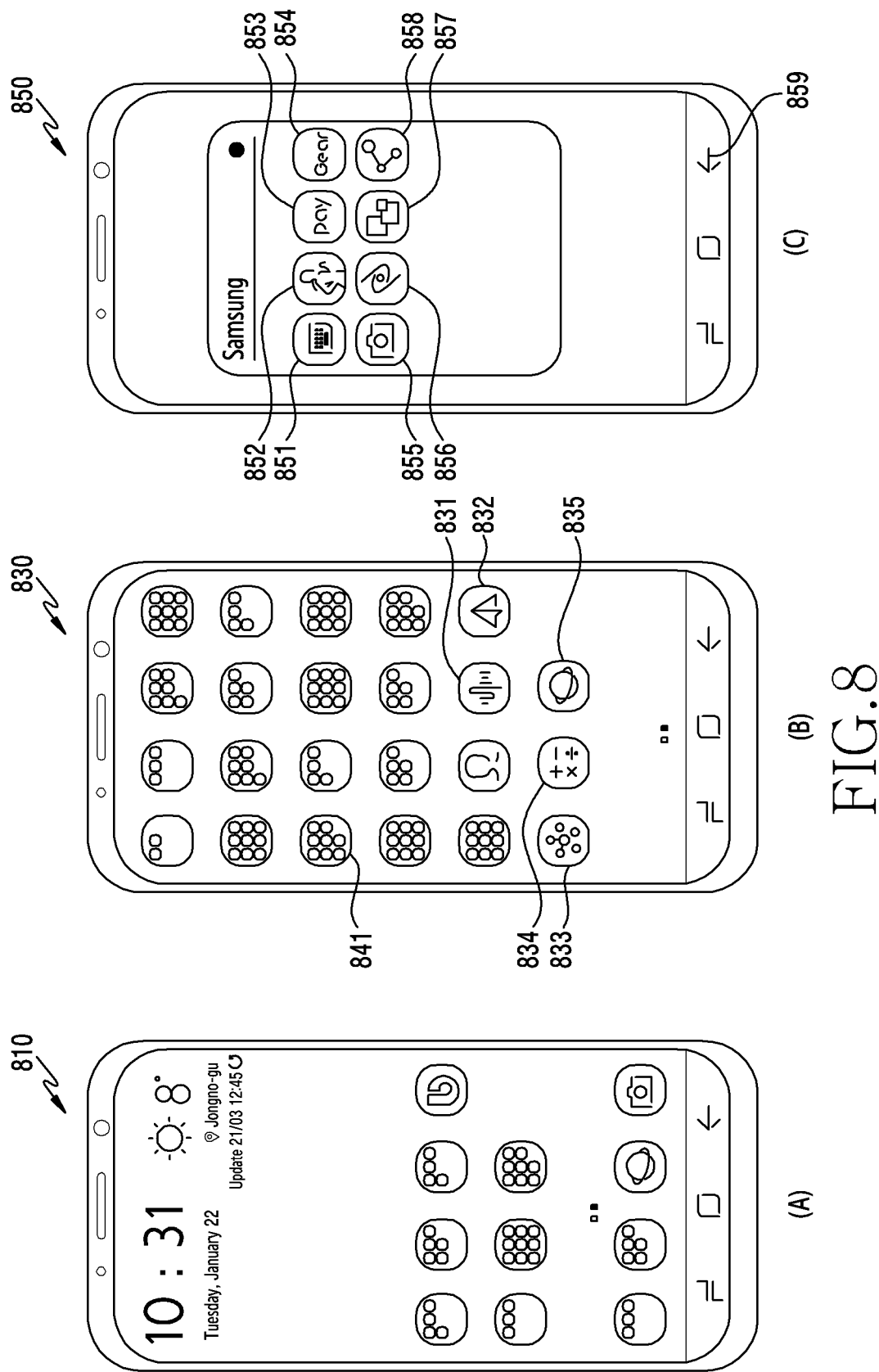
FIG. 8 illustrates an example of screens displayed by an electronic device according to certain embodiments.
Figure 9:
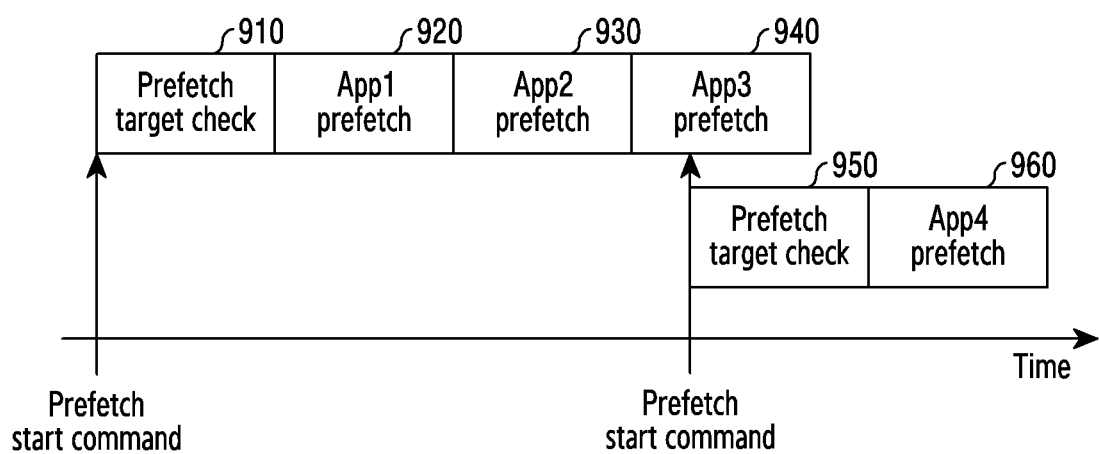
FIG. 9 illustrates a timing diagram depending on a prefetch of an electronic device according to certain embodiments.
Figure 10:
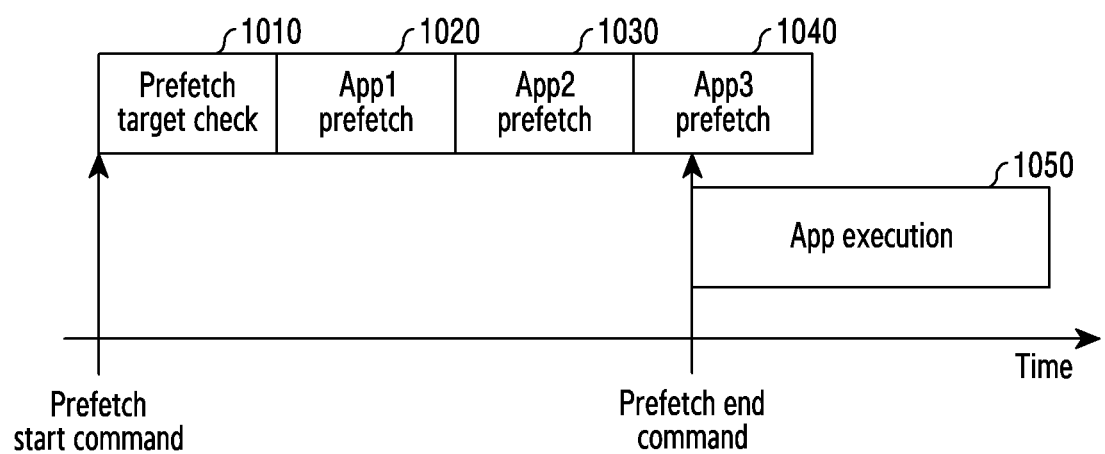
FIG. 10 illustrates a timing diagram depending on a prefetch of an electronic device according to certain embodiments.

FIG. 7 is a flowchart illustrating a prefetch of an electronic device (e.g., the electronic device 301 of FIG. 3) according to certain embodiments. FIG. 8 illustrates an example of screens 810, 830, and 850 displayed by an electronic device (e.g., the electronic device 301 of FIG. 3) according to certain embodiments. FIG. 9 and FIG. 10 illustrate a timing diagram depending on a prefetch of an electronic device (e.g., the electronic device 301) according to certain embodiments. FIG. 7 to FIG. 10 will be described with reference to the configurations of the electronic device 301 of FIG. 3.

When a user changes from a first screen 810 to a second screen 820 (Condition YES to decision 720), the processor identifies first applications corresponding to executable objects 831 . . . 835 being displayed on the second screen (operation 730), computes prefetch values of the ones (second applications) of the of first applications that are not running (operation 750), and prefetches certain ones of the second applications based on the prefetch values (operation 760).

Referring to FIG. 7, in certain embodiments, in operation 710, a processor (e.g., the processor 320 of FIG. 3) may receive an input. In certain embodiments, the input may be a user's touch input or drag input for a display device (e.g., the display device 360 of FIG. 3).

In certain embodiments, in operation 720, the processor 320 may identify whether a screen is changed (or switched) in response to the received input. In certain embodiments, when the user's touch input or drag input for the display device 360 occurs in a set region, the processor 320 may identify that the screen is changed in response to the received input. In certain embodiments, the processor 320 may allow the display device 360 to display the screen such that the screen is changed (or switched) from the first screen 810 currently being displayed in the second screen 830, in response to the received input.

In certain embodiments, if it is identified that the screen is changed (if "Yes"), in operation 730, the processor 320 may identify first applications corresponding to executable objects 831 to 835 being displayed in the changed second screen 830. In certain embodiments, the executable objects 831 to 835 may be icons indicating applications.

In certain embodiments, if it is identified that the screen is not changed (if "No"), the processor 320 may perform the operation 710. In certain embodiments, if it is identified that the screen is not changed (if "No"), the processor 320 may perform the operation 710 upon receiving a new input.

According to certain embodiments, although not shown, the processor 320 may receive a user input, and may identify whether the received input is an input indicating a screen change (or a screen switch). For example, upon receiving a user input for selecting a folder including a plurality of executable objects (e.g., icons), the processor 320 may identify that the user input is the user input indicating the screen change and determine the screen change. According to an embodiment, the processor 320 may identify the first applications, based on the determination on the screen change. For example, the processor 320 may identify the first applications corresponding to a plurality of objects included in the folder through an app launcher (e.g., the app launcher 410 of FIG. 4). According to an embodiment, the processor 320 may identify the first application before the changed screen is output to the display device 260 or while outputting part of the changed screen to the display device 360, based on the determination on the screen change.

In certain embodiments, in operation 740, the processor 320 may identify second applications which are not running among the first applications. In certain embodiments, the processor 320 may identify an application of which application data stored in the non-volatile memory 334 for executing the application is not loaded into the volatile memory 332 among the first applications as the second application which is not running.

In certain embodiments, when application data of applications corresponding to the executable objects 831 to 833 is not loaded into the volatile memory 332 and application data of applications corresponding to the executable objects 834 and 835 is loaded into the volatile memory 332, the processor 320 may identify the applications corresponding to the executable objects 831 to 833 as the second application.

In certain embodiments, in operation 750, the processor 320 may compute prefetch values of the second applications. In certain embodiments, the processor 320 may compute the prefetch values, based on at least one of information on applications, context information, application execution information, and predetermined prefetch efficiency.

In certain embodiments, the processor 320 may determine an order score of the second applications according to an order of recently used applications, based on recent usage information of applications. In certain embodiments, the order score may be determined to be higher when the application is used more recently. In certain embodiments, if information on all of the second applications does not exist in the recent usage information of the applications, the processor 320 may determine the order score such that all of the second applications have the same value.

In certain embodiments, the processor 320 may determine prefetch values by adjusting the order score of the second applications, based on prefetch efficiency pre-measured for each of the second applications. In certain embodiments, the processor 320 may determine the prefetch values by adding a weight to the order score such that the higher the prefetch efficiency, the higher the weight to be added. In certain embodiments, the prefetch efficiency may be determined by comparing a first entry time required to execute an application in a state where the application is not prefetched and a second entry time required to execute the application in a state where the application is prefetched. In certain embodiments, the prefetch efficiency may be evaluated such that the efficiency is higher when the second entry time is shorter than the first entry time. In certain embodiments, the prefetch efficiency may be determined by comparing a size of first data loaded into the volatile memory 332, measured when the application is executed in the state where the application is not prefetched, and a size of second data loaded into the volatile memory 332, measured when the application is executed in the state where the application is prefetched. In certain embodiments, the prefetch efficiency may be evaluated such that the efficiency is higher when the second data size is less than the first data size.

In certain embodiments, the processor 320 may generate input data, based at least on the first applications corresponding to the executable objects 831 to 835 being displayed in the changed second screen 830, and may use the generated input data to generate output data indicating execution probabilities of the first applications through neural network layers (e.g., the neural network layers 640). In certain embodiments, the processor 320 may identify the execution probabilities of the first applications as the probability scores. In certain embodiments, the processor 320 may determine the probability scores of the second applications among the first applications as a prefetch value. In certain embodiments, the processor 320 may determine the prefetch values, by adjusting the probability scores of the second applications, based on prefetch efficiency pre-measured for each of the second applications.

In certain embodiments, a scheme of determining prefetch values on the basis of recent usage information of applications may be referred to as a first scheme, and a scheme of determining prefetch values on the basis of neural network layers may be referred to as a second scheme.

In certain embodiments, the processor 320 may determine the prefetch values, based on the first scheme and the second scheme. In certain embodiments, the processor 320 may compute a first score depending on the first scheme and compute a second score depending on the second scheme, and may determine a value obtained by adding a predetermined weight into the second score and then summed up to the first score, as the prefetch value. In certain embodiments, the processor 320 may adjust the predetermined weight, according to whether the prefetched application is executed. In certain embodiments, the processor 320 may identify a first order depending on the first scheme of an application executed after being prefetched and a second order depending on the second scheme of the application executed after being prefetched. In certain embodiments, the processor 320 may compare the first order and second order of the application executed after being prefetched, and may adjust the predetermined weight, based on a result of the comparison. In certain embodiments, if the first order is higher than the second order, the processor 320 may adjust the predetermined weight to be decreased. In certain embodiments, if the first order is lower than the second order, the processor 320 may adjust the predetermined weight to be increased.

In certain embodiments, in operation 760, the processor 320 may prefetch second applications, based on the computed prefetch values. In certain embodiments, the processor 320 may sequentially prefetch the second applications, based on an order depending on the computed prefetch values. In certain embodiments, the processor 320 may prefetch third applications selected after selecting a predetermined number of third applications among the second applications, based on the computed prefetch values. In certain embodiments, the predetermined number may be determined based on a size of the volatile memory 332. In certain embodiments, the predetermined number may be determined based on the size of the volatile memory 332 and a pre-set size of data to be prefetched.

In certain embodiments, when the prefetch values computed in operation 750 are decreased in the order of an application indicated by the executable object 831, an application indicated by the executable object 832, and an application indicated by the executable object 833, the processor 320 may prefetch applications in the order of the application indicated by the executable object 831, the application indicated by the executable object 832, and the application indicated by the executable object 833.

In certain embodiments, when a predetermined event occurs even while any operations 710 to 760 are performed, the processor 320 may end the existing prefetch process. In certain embodiments, the processor 320 may decide that the predetermined event has occurred, upon generation of another input (or command) for changing a screen or an input (or command) for executing an arbitrary application.

In certain embodiments, the processor 320 may receive a new input (e.g., a touch input for an executable object 841 indicating a folder). In certain embodiments, in response to the received new input, the processor 320 may generate the third screen 850 and output it to the display device 360. In certain embodiments, if it is determined that the screen needs to be changed according to the new input, the processor 320 may end the prefetch process which is performed based on the existing second screen 830, and may start the prefetch process, based on the third screen 850 to be newly changed. In certain embodiments, the new input may include a user's drag input for the display device 360 to change the screen. Although the third screen 850 is exemplified as a folder entry screen in certain embodiments, this is for exemplary purposes only, and thus the third screen 850 may be at least one of a home screen, an apps screen, and the folder entry screen.

In certain embodiments, the processor 320 may receive another new input (e.g., a touch (or push) input for an executable object 859 (e.g., an icon or a button) indicating a back function). In certain embodiments, in response to the received new input, the processor 320 may generate the second screen 830 and output it to the display device 360. In certain embodiments, when it is determined that the screen is returned according to another new input, the processor 320 may resume, or newly start, the prefetch process which has been performed based on the existing second screen 830. In certain embodiments, when data of a second application depending on a prefetch process performed based on the existing second screen 830 is maintained in the non-volatile memory 332, the processor 320 may resume the prefetch process which has been performed based on the existing second screen 830.

In certain embodiments, the processor 320 may receive a new input (e.g., a touch input for the executable object 841 among executable objects 851 to 858 included in the newly changed third screen 850), and may execute an application represented by the executable object 841 indicated by the received new input, in response to the received new input. In certain embodiments, when an application is executed according to the new input, the processor 320 may end the prefetch process performed based on the newly changed third screen 850.

Referring to FIG. 9, in certain embodiments, the processor 320 may perform the operations 720 to 750 during a prefetch target check time 910 after a prefetch start command is generated upon receiving an input for changing a screen. In certain embodiments, during an app1 prefetch time 920 and an app2 prefetch time 930, the processor 320 may prefetch an application corresponding to an app1 (e.g., an application having a highest prefetch order) and an application corresponding to an app2 (e.g., an application having a second highest prefetch order). In certain embodiments, the processor 320 may perform the operation 760 during an app prefetch time.

In certain embodiments, during an app3 prefetch time 940, the processor 320 may prefetch an application corresponding to an app3 (e.g., an application having a third highest prefetch order). In certain embodiments, when a new prefetch start command (e.g., a command depending on another input for changing a screen) is generated during the application corresponding to the app3 is prefetched, the processor 320 may interrupt the prefetch of the application corresponding to the app3, and perform the operations 720 to 750 during a target check time 950. During an app4 prefetch time 960, the processor 320 may prefetch an application corresponding to an app4 (e.g., an application having a highest prefetch order in a newly changed screen).

Referring to FIG. 10, in certain embodiments, the processor 320 may perform the operations 720 to 750 during a prefetch target check time 1010 after a prefetch start command is generated upon receiving an input for changing a screen. In certain embodiments, during an app1 prefetch time 1020, an app2 prefetch time 1030, and an app3 prefetch time 1040, the processor 320 may prefetch applications corresponding to apps1 to 3.

In certain embodiments, if a prefetch end command (e.g., a command depending on an input for executing an arbitrary application) is generated during an application corresponding to the app3 is prefetched, the processor 320 may interrupt the prefetch of the application corresponding to the app3, and may execute an application corresponding to the input for executing the arbitrary application during an app execution time 1050.

Figure 11:
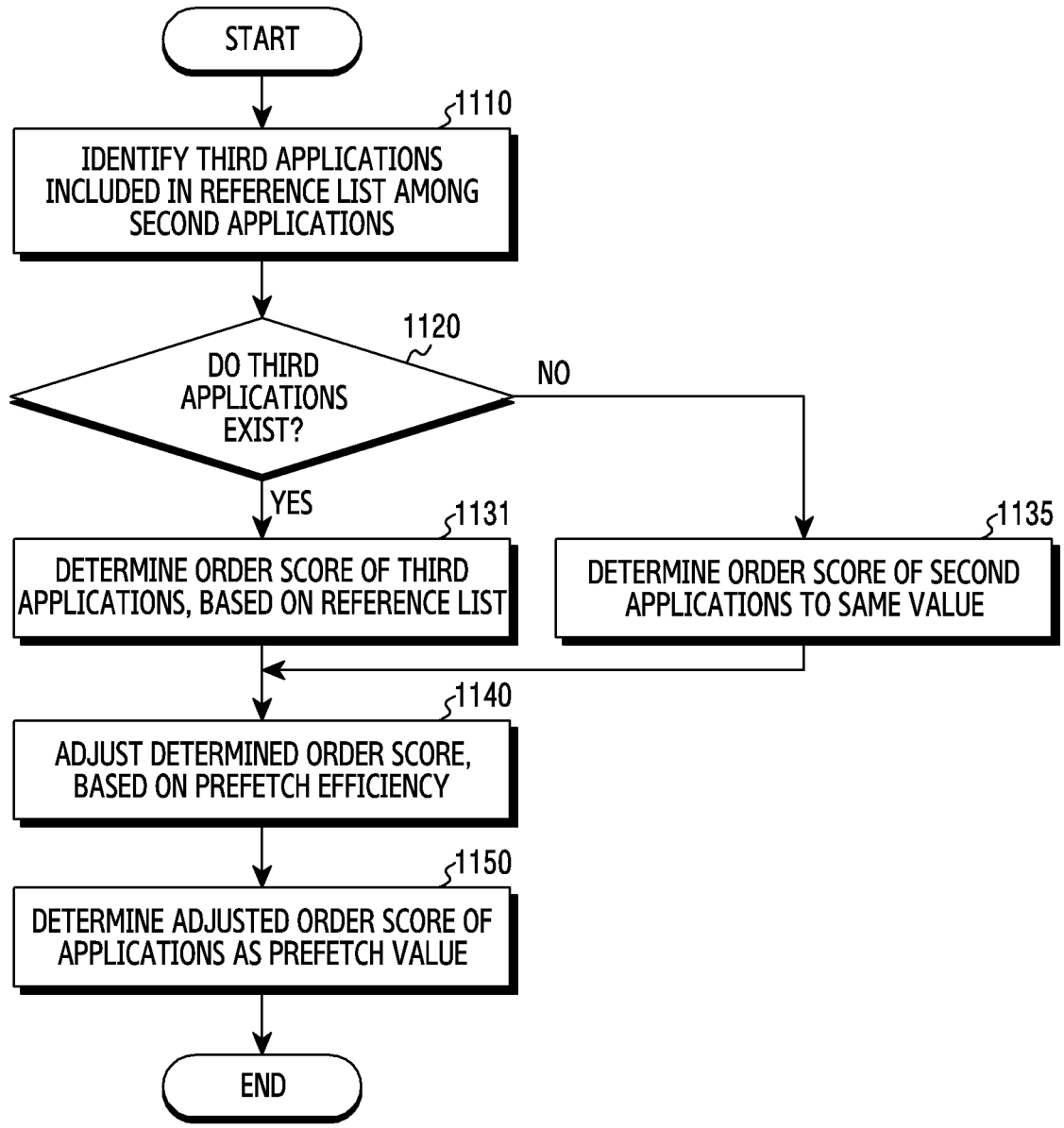
FIG. 11 is a flowchart of computing a prefetch value of an electronic device according to certain embodiments.
Figure 12:
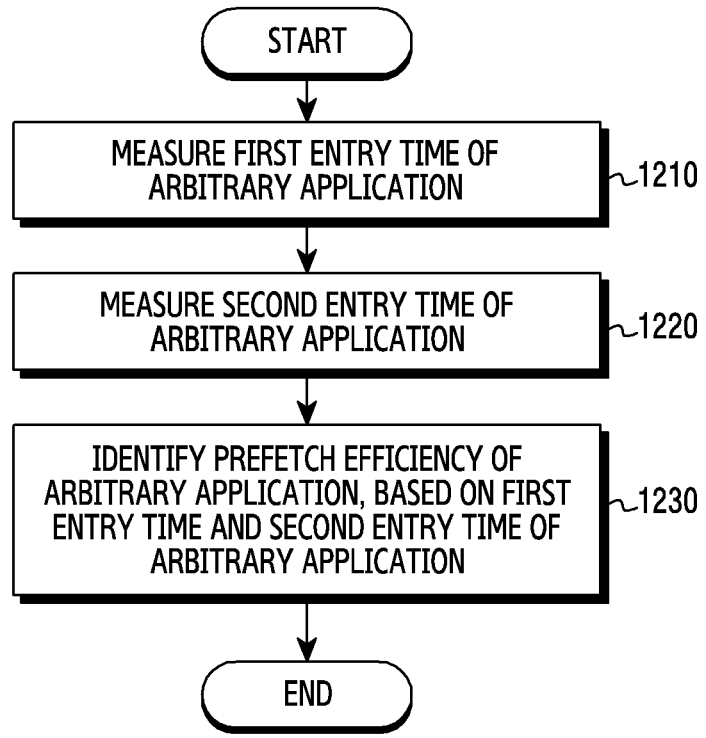
FIG. 12 is a flowchart of identifying prefetch efficiency of an electronic device according to certain embodiments.

FIG. 11 is a flowchart of computing a prefetch value of an electronic device (e.g., the electronic device 301) according to certain embodiments. FIG. 12 is a flowchart of identifying prefetch efficiency of an electronic device (e.g., the electronic device 301) according to certain embodiments. In certain embodiments, the prefetch value computing process of FIG. 11 may be included in the operation 750 of FIG. 7. FIG. 11 and FIG. 12 are described with reference to the configurations of the electronic device 301 of FIG. 3.

Referring to FIG. 11, in certain embodiments, in operation 1110, the processor 320 may identify third applications included in a reference list among second applications. In certain embodiments, the reference list may indicate an order of a pre-set number of applications among applications recently used. In certain embodiments, when an arbitrary application is executed, the processor 320 may edit the reference list so that a value indicating the arbitrary application (e.g., an application ID) is located at a first position in the reference list. In certain embodiments, if the value indicating the arbitrary application is located at the first position in the reference list, a position of a value indicating each of existing applications may be lowered by one level in the reference list. In certain embodiments, if the value indicating the arbitrary application is newly added to the reference list, a value indicating an application located at a last position among the existing applications included in the reference list may be removed from the reference list.

In certain embodiments, in operation 1120, the processor 320 may identify whether the third application exists. In certain embodiments, in operation 1120, if the third applications included in the reference list exists among the second applications (if "Yes"), the processor 320 may perform operation 1131. In certain embodiments, in operation 1120, if the third applications included in the reference list do not exist among the second applications (if "No"), the processor 320 may perform operation 1135.

In certain embodiments, in the operation 1131, the processor 320 may determine an order score of the third applications, based on the reference list. In certain embodiments, the processor 320 may determine the order score of the third applications such that the order score of the third applications are inversely proportional to an order depending on a position of the reference list. In certain embodiments, if the reference list indicates an order of ten applications, the number of the third applications is 3, and the three third applications are located respectively at $1^{st}$, $5^{th}$, and $10^{th}$ positions in the reference list, then the processor 320 may determine an order score of the third application located at the $10^{th}$ position in the reference list to be the lowest (e.g., 0.1), determine an order score of the third application located at the $5^{th}$ position in the reference list to be the second lowest (e.g., 0.5), and determine an order score of the third application located at the $1^{st}$ position in the reference list to be the highest (e.g., 1).

In certain embodiments, in the operation 1135, the processor 320 may determine the order scores of the second applications to the same value. In certain embodiments, if the third applications included in the reference list do not exist among the second applications, the processor 320 may determine an order score of the second applications to the same value (e.g., 0.5).

In certain embodiments, in operation 1140, the processor 320 may adjust the determined order score, based on prefetch efficiency. In certain embodiments, the processor 320 may adjust the order score by adding a weight to the order score such that the higher the prefetch efficiency, the higher the weight to be added. In certain embodiments, the prefetch efficiency may be predetermined based on operations 1210 to 1230 of FIG. 12. In certain embodiments, the operations 1210 to 1230 of FIG. 12 may be complete before performing the operations 1110 to 1150 of FIG. 11.

Referring to FIG. 12, in certain embodiments, in operation 1210, the processor 320 may measure a first entry time of an arbitrary application. In certain embodiments, the first entry time of arbitrary application may be a time required to execute the application in a state where the application is not prefetched. In certain embodiments, the processor 320 may measure the first entry time, when the arbitrary application is first executed after being installed. In certain embodiments, the entry time of the arbitrary application may be a time from when an input for executing the application is generated to a time when an initial screen of the arbitrary application is displayed.

In certain embodiments, in operation 1220, the processor 320 may measure a second entry time of the arbitrary application. In certain embodiments, the second entry time of the arbitrary application may be a time required to execute the application in a state where the application is prefetched.

In certain embodiments, in operation 1230, the processor 320 may identify the prefetch efficiency of the arbitrary application, based on the first entry time and second entry time of the arbitrary application. In certain embodiments, the processor 320 may evaluate the prefetch efficiency such that the arbitrary application has high prefetch efficiency when the second entry time is shorter than the first entry time. In certain embodiments, the processor 320 may evaluate the prefetch efficiency as a value obtained by subtracting the second entry time from the first entry time. In certain embodiments, the prefetch efficiency may have a negative value if the first entry time is shorter than the second entry time.

Although it is exemplified in certain embodiments that the processor 320 evaluates the prefetch efficiency on the basis of the entry time, this is for exemplary purposes only, and the processor 320 may evaluate the prefetch efficiency on the basis of an input and output level. In certain embodiments, the processor 320 may determine the prefetch efficiency of the arbitrary efficiency by comparing a size of first data loaded into the volatile memory 332, measured when the arbitrary application is executed in a state where the arbitrary application is not prefetched, and a size of second data loaded into the volatile memory 332, measured when the arbitrary application is executed in a state where the arbitrary application is prefetched. In certain embodiments, the processor 320 may evaluate the prefetch efficiency such that the arbitrary application has high prefetch efficiency when the second data size of the arbitrary application is less than the first data size of the arbitrary application.

Returning to FIG. 11, in certain embodiments, in operation 1150, the processor 320 may determine an adjusted order score of applications as a prefetch value. In certain embodiments, the processor 320 may determine a prefetch target application, based on the prefetch value.

Figure 13:
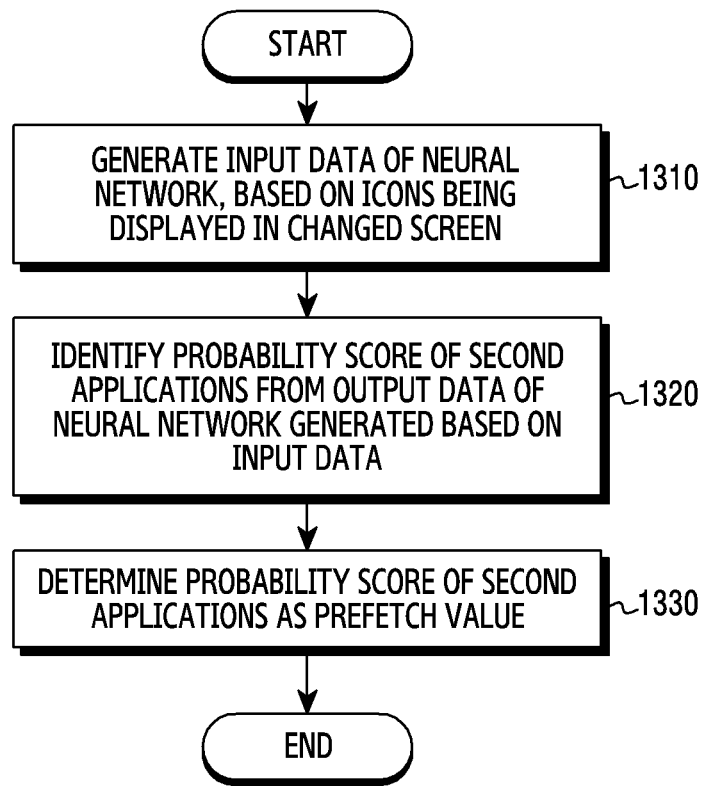
FIG. 13 is a flowchart of computing a prefetch value of an electronic device according to certain embodiments.

FIG. 13 is a flowchart of computing a prefetch value of an electronic device (e.g., the electronic device 301) according to certain embodiments. In certain embodiments, the prefetch value computing process of FIG. 13 may be included in the operation 750 of FIG. 7. FIG. 13 is described with reference to the configurations of the electronic device 301 of FIG. 3.

Referring to FIG. 13, in certain embodiments, in operation 1310, the processor 320 may generate input data (e.g., the input data 610 of FIG. 6) of a neural network (e.g., the neural network layers 640 of FIG. 6), based on icons being displayed in a changed screen (e.g., the second screen 830 of FIG. 8). In certain embodiments, the processor 320 may generate input data which has a set value (e.g., '1') for an application indicated by the icon included in the changed screen and has another set value (e.g., '0') for an application not indicated by the icon included in the changed screen. In certain embodiments, the processor 320 may generate input data to further indicate at least one of a current time, a position, and user information (e.g., age, gender).

In certain embodiments, in operation 1320, the processor 320 may identify probability scores of second applications from output data (e.g., the output data 670) of the neural network (e.g., the neural network layers 640) generated based on the input data (e.g., the input data 610). In certain embodiments, the processor 320 may identify values of elements (e.g., the elements 671, 674, or 677 of FIG. 6) of output data by using the probability scores of the applications in the respective elements.

In certain embodiments, in operation 1330, the processor 320 may determine probability scores of the second applications as a prefetch value. In certain embodiments, the processor 320 may adjust the probability scores of the second applications on the basis of prefetch efficiency of the second applications, and may determine the adjusted probability score as the prefetch value. In certain embodiments, the processor 320 may determine a prefetch target application, based on the prefetch value.

Figure 14:
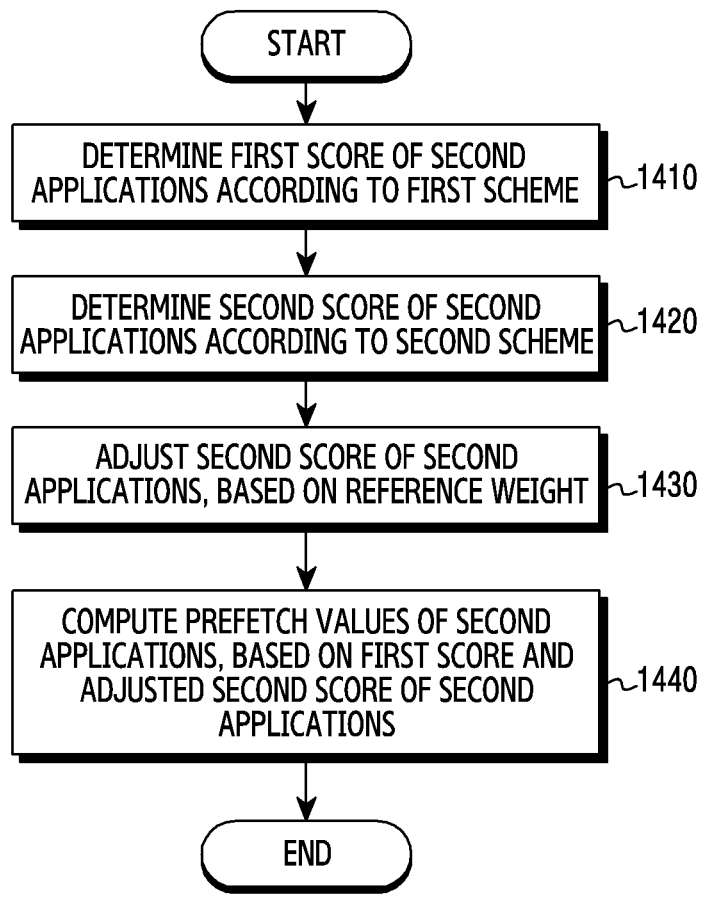
FIG. 14 is a flowchart of computing a prefetch value of an electronic device according to certain embodiments.
Figure 15:
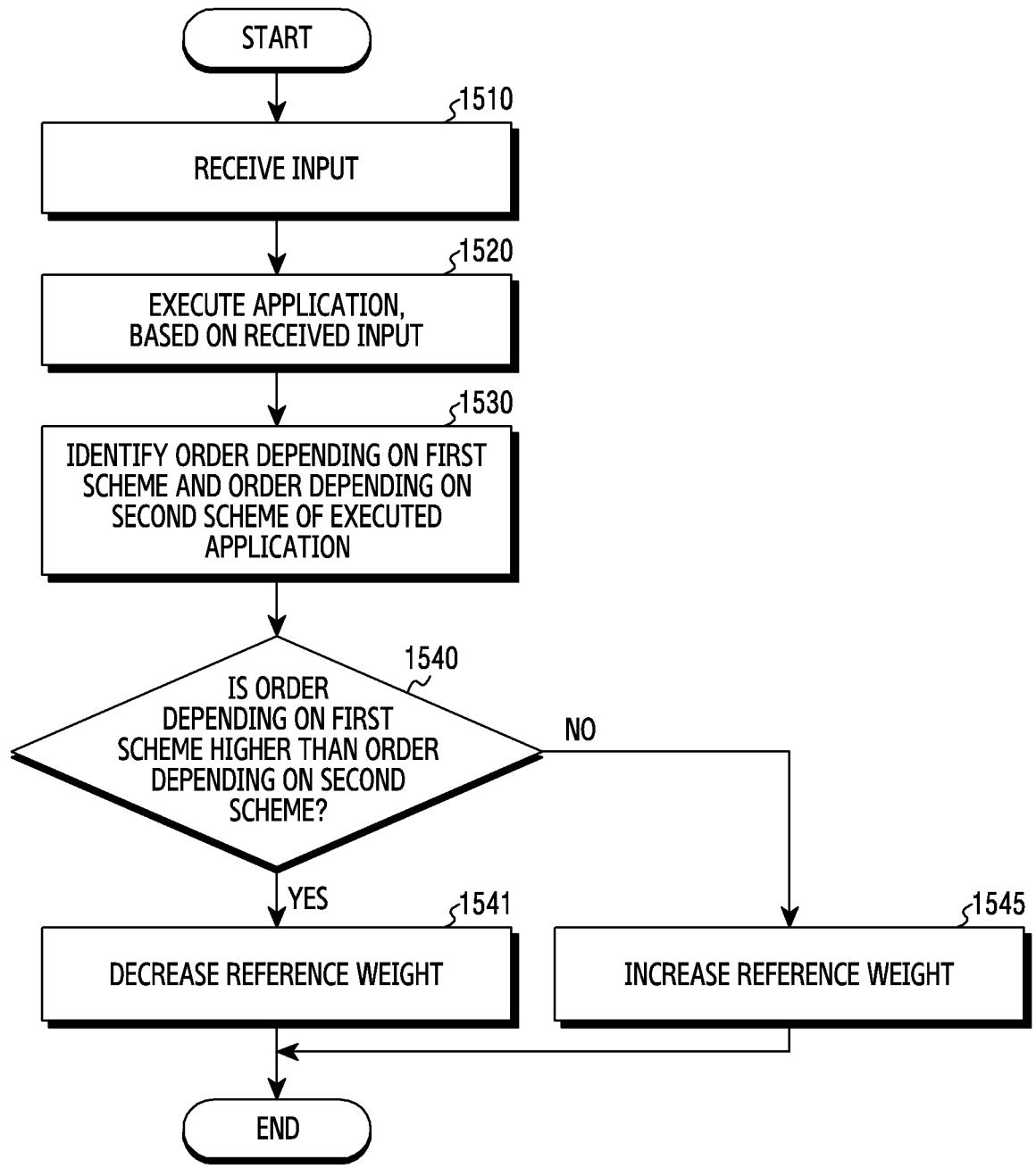
FIG. 15 is a flowchart of determining a prefetch weight of an electronic device according to certain embodiments.

FIG. 14 is a flowchart of computing a prefetch value of an electronic device (e.g., the electronic device 301) according to certain embodiments. FIG. 15 is a flowchart of determining a prefetch weight of an electronic device (e.g., the electronic device 301) according to certain embodiments. In certain embodiments, the prefetch value computing process of FIG. 14 may be included in the operation 750 of FIG. 7. FIG. 14 and FIG. 15 are described with reference to the configurations of the electronic device 301 of FIG. 3.

Referring to FIG. 14, in certain embodiments, in operation 1410, the processor 320 may determine a first score of second applications according to a first scheme. In certain embodiments, the first scheme may be a scheme of determining prefetch values, based on recent usage information of the applications. In certain embodiments, an operation of determining the first score of the second applications according to the first scheme may correspond to the operations 1110 to 1135 of FIG. 11.

In certain embodiments, in operation 1420, the processor 320 may determine a second score of the second applications according to a second scheme. In certain embodiments, the second scheme may be a scheme of determining prefetch values, based on neural network layers. In certain embodiments, an operation of determining the second score of the second applications according to the second scheme may correspond to the operations 1310 to 1320 of FIG. 13.

In certain embodiments, in operation 1430, the processor 320 may adjust the second score of the second applications, based on a reference weight. In certain embodiments, the reference weight may be predetermined based on operations 1510 to 1535 of FIG. 15. In certain embodiments, the operations 1510 to 1535 of FIG. 15 may be complete before performing the operations 1410 to 1440 of FIG. 14.

Referring to FIG. 15, in certain embodiments, in operation 1510, the processor 320 may receive an input. In operation 1520, the processor 320 may execute an application, based on the received input.

In certain embodiments, in operation 1530, the processor 320 may identify am order depending on the first scheme of the executed application and an order depending on the second scheme. In certain embodiments, the processor 320 may identify the order depending on the first scheme of the application executed based on the first score of the second applications depending on the first scheme, determined in the operation 1410. In certain embodiments, the processor 320 may identify the order of the second scheme of the application executed based on the second score of the second applications depending on the second scheme, determined in the operation 1420. In certain embodiments, the processor 320 may identify that an application having a high score has a high order.

In certain embodiments, in operation 1540, the processor 320 may determine whether the order based on the first scheme of the executed application is higher than the order based on the second scheme. In certain embodiments, if the order based on the first scheme of the executed application is higher than the order based on the second scheme (if "Yes"), the processor 320 may perform operation 1541. In certain embodiments, if the order based on the first scheme of the executed application is not higher than the order based on the second scheme (if "No"), the processor 320 may perform operation 1545.

In certain embodiments, if the order based on the first scheme of the first application is higher than the order based on the second scheme, in the operation 1541, the processor 320 may decrease a reference weight. In certain embodiments, the processor 320 may decrease the reference weight by subtracting a value corresponding to a set level from the reference weight.

In certain embodiments, if the order based on the first scheme of the first application is higher than the order based on the second scheme, in the operation 1545, the processor 320 may increase the reference weight. In certain embodiments, the processor 320 may increase the reference weight by adding a value corresponding to a set level to the reference weight.

Returning to FIG. 14, in certain embodiments, in operation 1440, the processor 320 may compute prefetch values of the second applications, based on the first score and adjusted second score of the second applications.

In certain embodiments, the processor 320 may adjust the second score of the second applications on the basis of the reference weight, and at the same time, may adjust the first score of the second applications on the basis of the reference weight. In certain embodiments, the processor 320 may adjust the second score by multiplying the second score of the second applications by the reference weight, and at the same time, by multiplying the first score of the second applications by a value obtained by subtracting the reference weight from 1. In certain embodiments, the processor 320 may compute the prefetch values of the second applications, based on the adjusted first score and adjusted second score of the second applications. In certain embodiments, the reference weight may have a value greater than or equal to 0 and less than or equal to 1.

An electronic device (e.g., the electronic device 301) according to certain embodiments can improve overall efficiency of a prefetch operation by selecting an application to be prefetched based on prefetch efficiency.

An electronic device (e.g., the electronic device 301) according to certain embodiments may include a display, a first method, a second memory having a plurality of applications installed therein to store data of the plurality of applications, and a processor. The processor may be configured to switch a screen displayed on the display from a first screen to a second screen which includes a plurality of objects respectively indicating the plurality of applications, identify applications which are not running among the plurality of applications, in response to the switching to the second screen, and load data of the at least one application from the second memory to the first memory in order to prefetch at least one application selected from among the identified applications, based on predetermined prefetch efficiency of each of the identified applications.

In certain embodiments, the prefetch efficiency may be predetermined based on a result of comparing information on first time required to execute an application in a state where data for the application is stored only in the second memory and information on second time required to execute the application in a state where the data for the application is stored in the first memory and the second memory.

certain embodiment In certain embodiments, the processor may be configured to identify an application currently not running among applications which are executed at least one time after the plurality of applications are installed, in response to the switching to the second screen.

In certain embodiments, the processor may be configured to load data of a pre-specified size among data of the at least one application from the second memory to the first memory, based on data access information for data of the at least one application.

In certain embodiments, the processor may be configured to, upon completion of the prefetch for the at least one application, display a pre-set visual effect on an object indicating the at least one application for which the prefetch is complete in the second screen.

In certain embodiments, the processor may be configured to determine a first score of each of the identified applications such that a recently used application has a higher value, based on application usage information, determine a prefetch value of each of the identified applications by adding a correction value to the first score of each of the identified applications such that the higher the predetermined prefetch efficiency, the higher the correction value to be added, determine a prefetch order of each of the identified applications such that the prefetch is performed preferentially in a descending order of the prefetch value, and select the at least one application, based on the determined prefetch order among the identified applications.

In certain embodiments, if it is identified based on the application usage information that all of the identified applications are not used recently, the processor may determine the first score of each of the identified applications to have the same value.

In certain embodiments, the processor may be configured to generate input data indicating information on the plurality of applications indicated by a plurality of objects included in the second screen among all of the applications installed in the second memory, determine an execution probability of each of the plurality of applications by computing the input data through a neural network layer, determine a second score of each of the identified applications, based on the execution probability of each of the plurality of applications, determine a prefetch value of each of the identified applications by adding a correction value to the second score of each of the identified applications such that the higher the predetermined prefetch efficiency, the higher the correction value to be added, determine a prefetch order of each of the identified applications such that the prefetch is performed preferentially in a descending order of the prefetch value, and select the at least one application, based on the determined prefetch order among the identified applications.

In certain embodiments, the processor may be configured to determine a first score of each of the identified applications such that a recently used application has a higher value, based on application usage information, generate input data indicating information on the plurality of applications indicated by a plurality of objects included in the second screen among all of the applications installed in the second memory, determine an execution probability of each of the plurality of applications by computing the input data through a neural network layer, determine a second score of each of the identified applications, based on the execution probability of each of the plurality of applications, determine a value obtained by adding the first score to a value obtained by applying a predetermined weight to the second score of each of the identified applications as a prefetch value of each of the identified applications, determine a prefetch order of each of the identified applications such that the prefetch is performed preferentially in a descending order of the prefetch value, and select the at least one application, based on the determined prefetch order among the identified applications.

In certain embodiments, when the prefetched at least one application is executed, the processor may identify a first order of the executed application on the basis of the first score of each of the identified applications, identify a second order of the executed application on the basis of the second score of each of the identified applications, decrease the weight by a set level if the first order is higher than the second order, and increase the weight by the set level if the first order is not higher than the second order.

In certain embodiments, the processor may be configured to, upon completion of the prefetch for the at least one application, display a pre-set visual effect on an object indicating the at least one application for which the prefetch is complete in the second screen.

In certain embodiments, the processor may be configured to receive an input for executing the at least one application for which the prefetch is complete, and display a pre-set visual effect, based on the input.

In certain embodiments, the processor may be configured to identify a pre-set event while performing a prefetch for the at least one application, interrupt the prefetch for the at least one application in response to the identifying of the pre-set event, and restore a memory area occupied by data of the at least one application loaded into the first memory while performing the prefetch for the at least one application. The pre-set event may be that the processor receives at least one of an application execution command and a screen switch command.

In certain embodiments, the data access information may include information on files used among a plurality of files of application data when an application is executed and information on data accessed by the processor from data of each of the files used.

In certain embodiments, the processor may identify a logical address space when the at least one application is executed, identify a physical address mapped to a logical address of the identified logical address space on the basis of a mapping table for mapping the logical address and the physical address, identify information of files mapped to the identified physical address, and generate the data access information on the basis of the identified information of the files.

A method of operating an electronic device (e.g., the electronic device 301) according to certain embodiments may include switching a screen displayed on a display of the electronic device from a first screen to a second screen which includes a plurality of objects respectively indicating the plurality of applications, identifying applications which are not running among the plurality of applications, in response to the switching to the second screen, selecting at least one application from among the identified applications, based on predetermined prefetch efficiency of each of the identified applications, and loading data of the at least one application stored in the second memory of the electronic device to the first memory of the electronic device in order to prefetch the selected at least one application.

In certain embodiments, the identifying of the applications which are not running may be to identify an application currently not running among applications which are executed at least one time after the plurality of applications are installed, in response to the switching to the second screen.

In certain embodiments, the loading to the first memory of the electronic device may be to load data of a pre-specified size among data of the at least one application from the second memory to the first memory, based on data access information for data of the at least one application.

In certain embodiments, the selecting of the at least one application may further include determining a first score of each of the identified applications such that a recently used application has a higher value, based on application usage information, determining a prefetch value of each of the identified applications by adding a correction value to the first score of each of the identified applications such that the higher the predetermined prefetch efficiency, the higher the correction value to be added, determining a prefetch order of each of the identified applications such that the prefetch is performed preferentially in a descending order of the prefetch value, and selecting the at least one application, based on the determined prefetch order among the identified applications.

In certain embodiments, the method may further include, if it is identified based on the application usage information that all of the identified applications are not used recently, determining the first score of each of the identified applications to have the same value.

In certain embodiments, the selecting of the at least one application may include generating input data indicating information on the plurality of applications indicated by a plurality of objects included in the second screen among all of the applications installed in the second memory, determining an execution probability of each of the plurality of applications by computing the input data through a neural network layer, determining a second score of each of the identified applications, based on the execution probability of each of the plurality of applications, determining a value obtained by adding the first score to a value obtained by applying a predetermined weight to the second score of each of the identified applications as a prefetch value of each of the identified applications, determining a prefetch order of each of the identified applications by adding a correction value to the second score of each of the identified applications such that the higher the predetermined prefetch efficiency, the higher the correction value to be added, and selecting the at least one application, based on the determined prefetch order among the identified applications.

In certain embodiments, the selecting of the least one application may include determining a first score of each of the identified applications such that a recently used application has a higher value, based on application usage information, generating input data indicating information on the plurality of applications indicated by a plurality of objects included in the second screen among all of the applications installed in the second memory, determining an execution probability of each of the plurality of applications by computing the input data through a neural network layer, determining a second score of each of the identified applications, based on the execution probability of each of the plurality of applications, determining a value obtained by adding the first score to a value obtained by applying a predetermined weight to the second score of each of the identified applications as a prefetch value of each of the identified applications, determining a prefetch order of each of the identified applications such that the prefetch is performed preferentially in a descending order of the prefetch value, and selecting the at least one application, based on the determined prefetch order among the identified applications.

In certain embodiments, the method may further include, when the prefetched at least one application is executed, identifying a first order of the executed application on the basis of the first score of each of the identified applications, identifying a second order of the executed application on the basis of the second score of each of the identified applications, decreasing the weight by a set level if the first order is higher than the second order, and increasing the weight by the set level the first order is not higher than the second order.

In certain embodiments, the method may further include, upon completion of the prefetch for the at least one application, displaying a pre-set visual effect on an object indicating the at least one application for which the prefetch is complete in the second screen.

In certain embodiments, the method may further include receiving an input for executing the at least one application for which the prefetch is complete, and displaying a pre-set visual effect, based on the input.

In certain embodiments, the method may further include identifying a pre-set event while performing a prefetch for the at least one application, interrupting the prefetch for the at least one application in response to the identifying of the pre-set event, and restoring a memory area occupied by data of the at least one application loaded into the first memory while performing the prefetch for the at least one application. The pre-set event may be that the processor receives at least one of an application execution command and a screen switch command.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the certain embodiments of the disclosure are not limited to a single or a plurality of components. Therefore, a component expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. An electronic device comprising:
a display;
a volatile memory;
a non-volatile memory storing a plurality of applications; and
a processor, wherein the processor is configured to:
switch a screen displayed on the display from a first screen to a second screen, wherein the second screen includes a plurality of objects respectively indicating the plurality of applications, wherein each of the plurality of objects are configured to launch the respective plurality of applications in response to receiving a touch input, and wherein the plurality of objects includes objects configured to launch respective applications which are not running; and
in response to the switching to the second screen:
identify applications which are not running among the plurality of applications;
select at least one application from among the identified applications, based on a predetermined criterion; and
load data of at least one of the identified applications among the plurality of applications that are not running from the non-volatile memory to the volatile memory,
wherein the predetermined criterion is based on a prefetch efficiency determined by at least one of:
comparing a first entry time required to execute an application in a state where the application is not prefetched and a second entry time required to execute the application in a state where the application is prefetched: or
comparing a size of first data loaded into the volatile memory, measured when the application is executed in the state where the application is not prefetched and a size of second data loaded into the volatile memory, measured when the application is executed in the state where the application is prefetched.

2. The electronic device of claim 1, wherein the processor is configured to identify an application currently not running among applications which are executed at least one time after the plurality of applications are installed, in response to the switching to the second screen.

3. The electronic device of claim 1, wherein the processor is configured to load data of a pre-specified size among data of the at least one application from the non-volatile memory to the volatile memory, based on data access information for data of the at least one application.

4. The electronic device of claim 1, wherein the processor is configured to, display a pre-set visual effect on an object indicating the at least one application upon loading of the at least one application from the volatile memory to the non-volatile memory.

5. The electronic device of claim 1, wherein the processor is configured to:
determine a first score of each of the identified applications such that a recently used application has a higher value, based on application usage information;
determine a prefetch value of each of the identified applications by adding a correction value to the first score of each of the identified applications such that a higher predetermined prefetch efficiency corresponding to the predetermined criterion, the higher the correction value to be added;
determine a prefetch order of each of the identified applications such that a prefetch is performed preferentially in a descending order of the prefetch value; and
select the at least one application, based on the determined prefetch order among the identified applications.

6. The electronic device of claim 1, wherein the processor is configured to after a prefetch operation of the at least one application has been completed:
receive an input selecting the at least one of the identified applications; and
display a pre-set visual effect, based on the input.

7. The electronic device of claim 1, wherein the processor is configured to:
generate input data indicating information on the plurality of applications indicated by a plurality of objects included in the second screen among all of the applications installed in the non-volatile memory;

determine an execution probability of each of the plurality of applications by computing the input data through a neural network layer;

determine a second score of each of the identified applications, based on the execution probability of each of the plurality of applications;

determine a prefetch value of each of the identified applications by adding a correction value to the second score of each of the identified applications such that a higher predetermined prefetch efficiency corresponding to the predetermined criterion, the higher the correction value to be added;

determine a prefetch order of each of the identified applications such that a prefetch is performed preferentially in a descending order of the prefetch value; and select the at least one application, based on the determined prefetch order among the identified applications.

8. The electronic device of claim 1, wherein the processor is configured to:

determine a first score of each of the identified applications such that a recently used application has a higher value, based on application usage information;

generate input data indicating information on the plurality of applications indicated by a plurality of objects included in the second screen among all of the applications installed in the non-volatile memory;

determine an execution probability of each of the plurality of applications by computing the input data through a neural network layer;

determine a second score of each of the identified applications, based on the execution probability of each of the plurality of applications;

determine a value obtained by adding the first score to a value obtained by applying a predetermined weight to the second score of each of the identified applications as a prefetch value of each of the identified applications;

determine a prefetch order of each of the identified applications such that a prefetch is performed preferentially in a descending order of the prefetch value; and select the at least one application, based on the determined prefetch order among the identified applications.

9. The electronic device of claim 1, wherein the processor is configured to:

in response to receiving an application execution command and a screen switch command, restoring a memory area occupied by data of the at least one application loaded into the volatile memory while performing a prefetch for the at least one application.

10. A method of operating an electronic device, the method comprising:

switching a screen displayed on a display of the electronic device from a first screen to a second screen, wherein the second screen includes a plurality of objects respectively indicating a plurality of applications, wherein each of the plurality of objects are configured to launch the respective plurality of applications in response to receiving a touch input, and wherein the plurality of objects includes objects configured to launch respective applications which are not running; and in response to the switching to the second screen:
identifying the applications which are not running among the plurality of applications;
selecting at least one of the applications which are not running, based on a predetermined criterion; and
performing a prefetch operation for the at least one application, wherein the prefetch operation comprises loading data of the at least one application stored in a non-volatile memory of the electronic device to a volatile memory of the electronic device, wherein the predetermined criterion is based on a prefetch efficiency determined by at least one of:

comparing a first entry time required to execute an application in a state where the application is not prefetched and a second entry time required to execute the application in a state where the application is prefetched: or comparing a size of first data loaded into the volatile memory, measured when the application is executed in the state where the application is not prefetched and a size of second data loaded into the volatile memory, measured when the application is executed in the state where the application is prefetched.

11. The method of claim 10, wherein the identifying of the applications which are not running is to identify an application currently not running among applications which are executed at least one time after the plurality of applications are installed, in response to the switching to the second screen.

12. The method of claim 10, wherein the loading to the volatile memory of the electronic device is to load data of a pre-specified size among data of the at least one application from the non-volatile memory to the volatile memory, based on data access information for data of the at least one application.

13. The method of claim 10, further comprising, displaying a pre-set visual effect on an object indicating the at least one application upon loading of the at least one application from the volatile memory to the non-volatile memory.

14. The method of claim 10, wherein the selecting of the at least one application comprising:

determining a first score of each of the identified applications such that a recently used application has a higher value, based on application usage information;

determining a prefetch value of each of the identified applications by adding a correction value to the first score of each of the identified applications such that a higher predetermined prefetch efficiency corresponding to the predetermined criterion, the higher the correction value to be added;

determining a prefetch order of each of the identified applications such that a prefetch is performed preferentially in a descending order of the prefetch value; and selecting the at least one application, based on the determined prefetch order among the identified applications.

15. The method of claim 10, further comprising, after the prefetch operation of the at least one application has been completed:

receiving the input selecting the at least one application; and displaying a pre-set visual effect, based on the input.

16. The method of claim 10, wherein the selecting of the at least one application comprising:

generating input data indicating information on the plurality of applications indicated by a plurality of objects included in the second screen among all of the applications installed in the non-volatile memory;

determining an execution probability of each of the plurality of applications by computing the input data through a neural network layer;

determining a second score of each of the identified applications, based on the execution probability of each of the plurality of applications;

determining a prefetch value of each of the identified applications by adding a correction value to the second score of each of the identified applications such that a higher predetermined prefetch efficiency corresponding to the predetermined criterion, the higher the correction value to be added;

determining a prefetch order of each of the identified applications such that a prefetch is performed preferentially in a descending order of the prefetch value; and selecting the at least one application, based on the determined prefetch order among the identified applications.

17. The method of claim 10, wherein the selecting of the at least one application comprising:

determining a first score of each of the identified applications such that a recently used application has a higher value, based on application usage information;

generating input data indicating information on the plurality of applications indicated by a plurality of objects included in the second screen among all of the applications installed in the non-volatile memory;

determining an execution probability of each of the plurality of applications by computing the input data through a neural network layer;

determining a second score of each of the identified applications, based on the execution probability of each of the plurality of applications;

determining a value obtained by adding the first score to a value obtained by applying a predetermined weight to the second score of each of the identified applications as a prefetch value of each of the identified applications;

determining a prefetch order of each of the identified applications such that a prefetch is performed preferentially in a descending order of the prefetch value; and selecting the at least one application, based on the determined prefetch order among the identified applications.

18. The method of claim 10, further comprising:

in response to receiving an application execution command and a screen switch command, restoring a memory area occupied by data of the at least one application loaded into the volatile memory while performing a prefetch for the at least one application.

* * * * *